(12) United States Patent
Veltman

(10) Patent No.: US 7,711,589 B2
(45) Date of Patent: May 4, 2010

(54) DETERMINATION OF A BOTTLENECK

(76) Inventor: Marcus Veltman, Korte Langestraat 93, Leiden (NL) 2312 XD ( * ) Notice: Subject to any disclaimer, the term of this patent is extended or adjusted under 35 U.S.C. 154(b) by 1549 days.

(21) Appl. No.: 10/862,161

(22) Filed: Jun. 7, 2004

(65) Prior Publication Data

US 2005/0273374 A1    Dec. 8, 2005

(51) Int. Cl.
*G06F 17/50* (2006.01)
(52) U.S. Cl. ......................................................... 705/7
(58) Field of Classification Search ...................... 705/7
See application file for complete search history.

(56) References Cited

U.S. PATENT DOCUMENTS

| 5,946,661 A | | 8/1999 | Rothschild et al. |
| 5,966,694 A | | 10/1999 | Rothschild et al. |
| 6,144,893 A | * | 11/2000 | Van Der Vegt et al. ...... 700/108 |

FOREIGN PATENT DOCUMENTS

NL    1000191 C    11/1995

OTHER PUBLICATIONS

Kee et al (A comparative analysis of utilizing activity-based costing and the theory of constraints for making product-mix decisions) Dec. 2000, Elsevier Science, pp. 1-32.*

Elftman (Examination of the effects of bottlenecks and production control rules at assembly stations), Dec. 1999, University of Florida; pp. 1-107.*

Hillier & Lieberman, "Introduction to Operations Research", Sixth Edition, 1995, McGraw-Hill Book Co., Singapore, pp. 25-67 and 558-607.

* cited by examiner

*Primary Examiner*—Romain Jeanty

(57) ABSTRACT

A bottleneck determination method and system are disclosed. Sequential processes are defined and certain attributes for each process are quantified. These attributes may include a beginstock amount, a production amount, and a spoilage amount. Using the attributes, calculations are performed, and the results of these calculations are used to select processes that may be bottlenecks. Further calculations are performed with regard to this selected group, and the results of these further calculations are used to select a bottleneck process.

14 Claims, 19 Drawing Sheets

```
┌─────────────────────────────────────────────────────────┐
│                          ┌─40                           │
│ PRODUCTS OF FACTORY Z DURING PERIOD T                   │
│ FILE   VIEW   PRODUCT-ANALYSIS   PERIOD-ANALYSIS   INFO │
│ ┌──────────────┐  ┌─────────────────────────────────┐   │
│ │              │  │                      ┌─44       │   │
│ │ DRESS HANGER │  │ NAME         [DRESS HANGER]     │   │
│ │ SHOEHORN     │  │ SALES TARGET [100,000]          │   │
│ │              │  │                    ─45          │   │
│ │              │  │            AVERAGE   TARGET     │   │
│ │              │  │         46─┐            ┌─47    │   │
│ │              │  │ PRICE     [1.00]     [1.00]     │   │
│ │              │  │         49─┐            ┌─48    │   │
│ │              │  │ VARIABLE COSTS [0.10] [0.10]    │   │
│ │              │  │                                 │   │
│ │              │  │ GROSS MARGIN   [0.90] [0.90]    │   │
│ │              │  └─────────────────────────────────┘   │
│ │              │     ┌─41      ┌─43         ┌─42        │
│ │              │    [ADD]    [CHANGE]    [DELETE]       │
│ │              │ ┌─50            ┌─51                   │
│ │              │    [SHOW PRODUCT PROCESSES]            │
│ └──────────────┘                                        │
└─────────────────────────────────────────────────────────┘
```

FIG. 6

| DRESS HANGER | | | | |
|---|---|---|---|---|
| FILE | VIEW | PRODUCT-ANALYSIS | PERIOD-ANALYSIS | INFO |

NAME OF PROCESS: SALES

NUMBER OF INPUTTING PROCESSES: 1

THE PRODUCTION OF SALES: 80,000

THE BEGINSTOCK OF SALES: 0

THE SPOILAGE OF SALES: 0

SAVE  CANCEL

FIG. 9

| PRODUCTNUMBER | 2 | 1 | 2 | 1 | 1 | 1 | 1 | 1 | 1 |
|---|---|---|---|---|---|---|---|---|---|
| PROCESSNUMBER | 29 | 26 | 28 | 20 | 25 | 24 | 21 | 21 | 23 |
| PROCESSNAME | SALES | SALES | CASTING | PURCHASE | PACKING | FINISHING | CASTING | CASTING | SAWING |
| NEXTPROCESSNUMBER |  |  | 29 | 21 | 26 | 25 | 24 | 24 | 24 |
| NEXTPROCESSNAME | SALES |  | SALES | CASTING | SALES | PACKING | FINISHING | FINISHING | FINISHING |
| PRODUCTION(P,S,T) | 180000 | 80000 | 190000 | 100000 | 70000 | 70000 | 85000 | 85000 | 80000 |
| SPOILAGE(P,S,T) | 0 | 0 | 30000 | 0 | 0 | 0 | 15000 | 15000 | 0 |
| BEGINSTOCK(P,S,T) | 0 | 0 | 20000 | 0 | 0 | 0 | 0 | 0 | 0 |
| BEGINSTOCK-FOLLOWINGPROCESSES(P,S,T) | 0 | 10000 | 0 | 10000 | 0 | 10000 | 10000 | 10000 | 10000 |
| INPUTTINGPROCESSES | 1 | 1 | 2 | 0 | 1 | 2 | 1 | 1 | 0 |
| PRODUCTION-RELEVANTINPUTTINGPROCESS(P,S,T) | 190000 | 70000 | 0 | 0 | 70000 | 85000 | 100000 | 100000 | 0 |
| SPOILAGE-RELEVANTINPUTTINGPROCESS(P,S,T) | 30000 | 0 | 0 | 0 | 0 | 15000 | 0 | 0 | 0 |
| BEGINSTOCK-RELEVANTINPUTTINGPROCESS(P,S,T) | 20000 | 10000 | 0 | 0 | 0 | 0 | 0 | 0 | 0 |
| RELEVANTINPUTTINGPROCESS | CASTING | PACKING | . | . | FINISHING | FINISHING | CASTING | PURCHASE |  |
| INPUTABUNDANCE(P,S,T) | 0 | 0 | 0 | . | 0 | 0 | 0 | 30000 | 0 |
| OUTPUT(P,S,T) | 180000 | 80000 | 180000 | 110000 | 80000 | 80000 | 80000 | 80000 | 90000 |

FIG. 15A

| | | | | | |
|---|---|---|---|---|---|
| PRODUCTNUMBER | 1 | 1 | 1 | 1 | 2 |
| PROCESSNUMBER | 21 | 23 | 20 | 28 | |
| PROCESSNAME | CASTING | SAWING | PURCHASE | CASTING | |
| NEXTPROCESSNUMBER | 24 | 24 | 21 | 29 | |
| NEXTPROCESSNAME | FINISHING | FINISHING | CASTING | SALES | |
| PRODUCTION(P,S,T) | 85000 | 80000 | 100000 | 190000 | |
| SPOILAGE(P,S,T) | 15000 | 0 | 0 | 30000 | |
| BEGINSTOCK(P,S,T) | 0 | 0 | 0 | 20000 | |
| BEGINSTOCK-FOLLOWINGPROCESSES(P,S,T) | 10000 | 10000 | 10000 | 0 | |
| INPUTTINGPROCESSES | 1 | 0 | 0 | 0 | |
| PRODUCTION-RELEVANTINPUTTINGPROCESS(P,S,T) | 100000 | 0 | 0 | 0 | |
| SPOILAGE-RELEVANTINPUTTINGPROCESS(P,S,T) | 0 | 0 | 0 | 0 | |
| BEGINSTOCK-RELEVANTINPUTTINGPROCESS | PURCHASE | | | | |
| INPUTABUNDANCE(P,S,T) | 30000 | 0 | . | . | . |
| OUTPUT(P,S,T) | 80000 | 90000 | 110000 | 180000 | |

FIG. 15B

DETERMINATION OF A BOTTLENECK

BACKGROUND

1. Field of the Invention

The invention relates generally to devices of determining a bottleneck. For example, a product may be produced and brought to market via the coordination of many processes. If one of the processes limits the production or sales of the product, that process is often referred to as a "bottleneck". It may be desirable to identify a bottleneck and quantify the detrimental effect the bottleneck has on a business.

2. Description of the Prior Art

In a typical business one or more processes may be involved in the production and selling of a good or service (herein collectively referred to as "product"). As an example, consider the production and selling of product X, which includes processes as follows: purchasing raw materials, cutting, casting and selling. The bottleneck is the process having the lowest output that is not a consequence of low input, which that process received from an inputting process. A bottleneck limits the amount of products that can be sold by a business during a period. If a business wants to raise its sales, it should invest in its bottlenecks. The investments in bottlenecks should enlarge the production capacity of the bottlenecks, and might include, for example, investments in machines, tools, personnel and improved working methods. Investments in processes which are not bottlenecks will not raise sales and profit, and can be a waste of money and time. In order to determine which investments are profitable and which investments are not, it is important for a business to know which processes are bottlenecks and which processes are not.

Few businesses use mathematical optimization techniques like Linear Programming or Nonlinear Programming to determine their bottlenecks. These techniques include the formulation of an objective function. The objective function is to be maximized or minimized. One or more factors which constrain the value of the objective function are determined and expressed by constrain functions. See for example, Frederick S. Hiller and Gerald J. Lieberman, "Introduction to operations research", McGraw-Hill (1995) in which there is provided a description of techniques of Linear Programming and Nonlinear Programming. If a business uses Linear Programming or Nonlinear Programming to determine bottlenecks, it must formulate an objective function and one or more constrain functions as well. The objective function expresses an object, such as total sales during a period. In order to determine which processes are bottlenecks, which constrain a higher value of the objective function because of their limited maximum production capacity, the limited maximum production capacity of each process is expressed in constrain functions. At the maximum value of the objective function, a business determines which of the limited maximum production capacities, expressed in constrain functions, constrain total sales during a period. At the maximum value of the objective function, one or more processes can be identified as bottlenecks, which constrain a higher value of sales. If a business uses Linear Programming or Nonlinear Programming only the processes, for which a certain fixed maximum production capacity can be determined, can be included. There are processes for which a certain fixed maximum production capacity can be determined easily. For instance a production process X can produce 10,000 pieces of product A or 3,000 pieces of product B during a period. There are however also processes for which it is impossible to determine a certain fixed maximum production capacity. Take for instance sales department S which spends only one hour on a sales order for 1000 products A, but also spends 2 days on a sales order for 2 products A and a week on a customer who does not buy anything. Processes for which no fixed maximum production capacity can be determined, such as sales department S, can therefore never be identified as a bottleneck using Linear Programming or Nonlinear Programming, although these processes can be very important bottlenecks.

In the method described in U.S. Pat. No. 5,946,661, a bottleneck is the process which yields the fewest quantity of products per unit of processing time or yields the lowest value of products per unit of processing time. In order to determine the quantity of products per unit of processing time and the value of products per unit of processing time, the processing time of each product in processes are calculated. In the method described in U.S. Pat. No. 5,966,694 a bottleneck is the process which yields the fewest quantity of products per unit of processing time. The processing times of each product in processes are calculated in order to determine the quantity of products per unit of processing time. In a typical business with a plurality of products, there are important processes which work on a plurality of products at the same time. An account manager for instance who works on a sales order for 100 units of product A, 230 units of product B and 12 units of product C, works on a plurality of products at the same time. Or a warehouse-clerk who moves 4000 pieces of product X and 16000 pieces of product Y, works on a plurality of products at the same time. Or a buying department which buys 1 ton of raw material for the production of 12 types of products works on a plurality of products at the same time. If a process works on a plurality of products at the same time it can be difficult or even impossible to determine the processing time of each product in this process. These processes can therefore never be identified as bottlenecks using the methods and systems described in U.S. Pat. No. 5,946,661 and U.S. Pat. No. 5,966,694, although these processes can be very important bottlenecks.

In U.S. Pat. No. 6,144,893 a bottleneck is a subprocess which dictates the maximum speed of a process. The maximum speed is thereby measured in production units per hour. The method comprises identifying a problem in a process and determining how much processing time the process loses due to the problem. Then the financial value of the problem is calculated based on the maximum bottleneck speed and how much processing time the process loses due to the problem. In a typical business with a plurality of products, there are important processes and subprocesses for which it is very difficult or even impossible to determine its maximum speed. For instance it is very difficult to determine the maximum speed of a sales department Q, which sold 3,000,000 of products in one hour on Monday but did not sell anything on Tuesday. It is also very difficult to determine the maximum speed of a purchasing department P, which can order raw materials for the production of millions of products in just one phone call. In a typical business there are also many production processes for which it is hard to determine its maximum bottleneck speed. It is therefore very difficult to identify a bottleneck in processes like sales department Q, purchasing department P and many production processes, and it is practically impossible to determine the financial value of a problem in these processes based on the maximum speed of these processes. Thus the method and system described in U.S. Pat. No. 6,144,893 has the same drawback as the methods and systems described in U.S. Pat. No. 5,946,661 and U.S. Pat. No. 5,966,694, and the method of Linear Programming and Nonlinear Programming: not all (sub)processes which are involved in the production and selling of products can be included and thus not all the bottlenecks may be detected.

Netherlands Pat. No. 1000191 describes a set of formulas and equations which a business can use to determine its bottlenecks. According to this patent, a process is a bottleneck if a negative variance in revenues originates in that process. The invention describes For. 1 which a business can use to determine whether a negative variance in revenues originated in a process during a period. In order to determine whether a negative variance in revenues of product i originated in process s, a business uses the data on product i and process s in For. 1. If the value of For. 1 is smaller than zero when the data on product i and process s are used in For. 1, then a negative variance in revenues originated in process s and process s was a bottleneck in the production of product i. If the value of For. 1 is equal to zero, when the data on product i and process s are used in For. 1, then no negative variance in revenues of product i originated in process s and process s was not a bottleneck in the production of product i. For. 1 states:

$$\min[osi-\min(pi-bevises,oti+bevis),0]*Vi \qquad \text{(For. 1)}$$

wherein:
  osi indicates the quantity of production of process s of product i during the concerned period;
  pi indicates the budgeted production of product i or the market demand of product i during the concerned period;
  bevises indicates the stock of products i that were already processed by process s, but were not processed by all the succeeding processes of process s at the beginning of the concerned period;
  oti indicates the quantity of products i that were processed by the process which directly precedes process s during the concerned period;
  bevis indicates the stock of products i that were already processed by the process which directly precedes process s but were not yet processed by process s at the beginning of the concerned period and;
  Vi indicates the selling price of product i.

Using For. 1, according to Netherlands Pat. No. 1000191 can lead to a false determination of bottlenecks. To illustrate this, consider the example of company Y, illustrated in FIG. 1. Company Y produces and sells only product i. Product i can be sold in the company Y's own shop, or product i can be sold and shipped to other companies by the expedition department. During period t, production department 1 produced 2000 units of product i while the total market demand was 1200 units of products i. Production department 1 delivered 1000 units of product i to shop 2 and 1000 units of product i to expedition department 3. Shop 2 sold 700 units of product i and expedition department 3 shipped 500 units of product i to other companies. At the beginning of period t there were no stocks. When company Y uses For. 1 to determine to what extend shop 2 was a bottleneck during period t, it calculates:

$$\min[700-\min(1200-0,2000+0),0]*Vi=-500*Vi$$

Thus if company Y detects bottlenecks according to Netherlands Pat. No. 1000191, it determines that shop 2 was a bottleneck with a magnitude of 500 units of product i. This is a false determination of a bottleneck. Shop 2 was not a bottleneck because shop 2 did not have the lowest output and shop 2 did not limit the amount of units of product i that were sold during period t. Moreover, shop 2 and expedition department 3 processed 1200 units of products i, while the total market demand was 1200 units of product i. They both could not do a better job. In fact, company Y did not have any bottleneck at all during period t.

Netherlands Pat. No. 1000191 also discusses the situation wherein a product consists of two or more subproducts which form one product together and which can only be sold together as one product. As an example, Netherlands Pat. No. 1000191 describes company Dzeng which produces a product ("product i" for short hereinafter), which consists of two subproducts ("subproduct ia" and "subproduct ib" for short hereinafter). This example is illustrated in FIG. 2. Subproduct ia is processed by purchase plastic process 4, cast handle process 5, assemble process 6 and sales process 7. Subproduct ib is processed by purchase aluminium process 8, thump process 9, form process 10, assemble process 6 and sales process 7. According to Netherlands Pat. No. 1000191 a business can use For. 2 to determine whether a negative variance in revenues originated in the production and selling of subproduct ia in process s and thus whether process s was a bottleneck in the production and selling of subproduct ia. In order to determine whether a negative variance originated in process s, a business uses the data on subproduct ia and process s in For. 2. If the value of For. 2 is smaller than zero when the data on subproduct ia and process s are used in For. 2, then a negative variance originated in process s and process s was a bottleneck in the production and selling of subproduct ia. If the value of For. 2 is equal to zero, when the data on subproduct ia and process s are used in For. 2, then no negative variance in revenues originated in process s and process s was not a bottleneck in the production of subproduct ia. For. 2 states:

$$\min[osia-\min(pi-beviases,otia+bevias),0]*Via \qquad \text{(For. 2)}$$

wherein:
  osia indicates the quantity of production of process s of subproduct ia during the concerned period;
  pi indicates the budgeted production of product i or the market demand of product i during the concerned period;
  beviases indicates the stock of subproducts ia that were already processed by process s, but were not processed by all the succeeding processes of process s at the beginning of the concerned period;
  otia indicates the quantity of subproducts ia that were processed by the process which directly precedes process s during the concerned period;
  bevias indicates the stock of subproducts ia that were already processed by the process which directly precedes process s but were not yet processed by process s at the beginning of the concerned period and;
  Via indicates the selling price of subproduct ia.

Using For. 2, according to Netherlands Pat. No. 1000191 can also, lead to a false determination of bottlenecks. To illustrate this consider an example of company Dzeng, illustrated in FIG. 2, which produced only product i during period t. During period t, purchase plastic process 4 processed 1000 units of subproduct ia. Cast handle process 5 processed 900 units of subproduct ia. Assemble process 6 and sales process 7 both processed 500 units of subproduct ia. Purchase aluminium process 8, thump process 9, form process 10, assemble process 6 and sales process 7 all processed 500 units of subproduct ib. At the beginning of period t no stocks were present. The total market demand and budgeted production for product i during period t was 1000 units. When company Dzeng uses For. 2 to determine to what extent cast handle process 5 was a bottleneck during period t, it calculates:

$$\min[900-\min(1000-0,1000+0),0]*Via=-100*Via$$

Thus if company Dzeng detects bottlenecks according to Netherlands Pat. No. 1000191, it determines that cast handle process 5 was a bottleneck during period t with a magnitude of 100*Via. In other words, according to Netherlands Pat. No. 1000191 a negative variance in revenues originated in cast handle process 5. This conclusion is however false. Cast handle process 5 was not a bottleneck because cast handle process 5 did not have the lowest output and cast handle process 5 did not limit the sales of product i during period t. Because there were only 500 units of subproduct ib available and because subproduct ia can only be sold together with subproduct ib, sales were limited to 500 units. Even if cast handle process 5 had produced an enormous amount of units of ia during period t, sales would still be limited to 500 units. The sales were not limited by the cast handle process 5 during period t. No negative variance in revenues originated in cast handle process 5.

Netherlands Pat. No. 1000191 pays special attention to processes which receive input from two or more processes. In Netherlands Pat. No. 1000191 a process which receives input from two or more processes is called a "combilink". In the example of company Dzeng, illustrated in FIG. 2, assemble process 6 is a combilink. The combilink combines several subproducts. Assemble process 6 for example combines subproduct ia and subproduct ib. If a subproduct can not be combined with another subproduct in the combilink because the other subproduct is missing, then the combilink has incomplete input. According to Netherlands Pat. No. 1000191 a negative variance in revenues which originated because subproduct ia could not be combined with all the other subproducts in the combilink, can be calculated using For. 3. In order to determine whether a negative variance in revenues originated in the combilink because subproduct ia could not be combined with other subproducts, a business uses data on the combilink (process s) and data on all the subproducts which the combilink combines (subproduct ia, subproduct ib, etc.) in For. 3. If the value of For. 3 is smaller than zero when data on the combilink and data on all the subproducts which the combilink combines are used in For. 3, then a negative variance in revenues originated in the combilink because subproduct ia could not be combined with other subproducts in the combilink. If the value of For. 3 is equal to zero, when data on the combilink and all the subproducts which the combilink combines are used in For. 3, then no negative variance occurred because of incomplete input.

min[min(bevibs+otib, ..., bevins+otin,pi)−min(bevias+otia,pi),0]*Via    (For. 3)

wherein:
pi indicates the budgeted production of product i or the market demand of product i;
bevibs indicates the stock of subproducts ib that were already processed by one of the processes which directly precedes process s but were not yet processed by process s at the beginning of the concerned period;
bevins indicates the stock of subproducts in that were already processed by one of the processes which directly precedes process s but were not yet processed by process s at the beginning of the concerned period;
bevias indicates the stock of subproducts ia that were already processed by one of the processes which directly precedes process s but were not yet processed by process s at the beginning of the concerned period;
otib indicates the quantity of subproducts ib that were processed during the concerned period by one of the processes which directly precedes process s;
otin indicates the quantity of subproducts in that were processed during the concerned period by one of the processes which directly precedes process s;
otia indicates the quantity of subproducts ia that were processed during the concerned period by one of the processes which directly precedes process s and;
Via indicates the selling price of subproduct ia.

Using For. 3, according to Netherlands Pat. No. 1000191 can also lead to a false determination of negative variance in revenues. To illustrate this, consider another example of company Dzeng illustrated in FIG. 2. During period t, company Dzeng only produced product i, which consists of subproduct ia and subproduct ib. During period t, purchase plastic process 4, cast handle process 5 and sales process 7 processed 1000 units of subproduct ia. Assemble process 6 processed 300 units of subproduct ia during period t. Purchase aluminium process 8, thump process 9 and sales process 7 all processed 1000 units of subproduct ib. Assemble process 6 and form process 10 both processed 300 units of subproduct ib. The stock of subproducts ia that were already processed by assemble process 6 but not yet by sales process 7 at the beginning period t held 700 units of subproduct ia. The stock of subproducts ib that were already processed by assemble process 6 but not yet by sales process 7 at the beginning of period t held 700 units of subproduct ib. There were no other stocks present at the beginning of period t. The total market demand and budgeted production for product i during period t was 1000 units. When company Dzeng uses For. 3 to determine whether a negative variance occurred in the assemble process 6 because in this combilink subproduct ia could not be combined with subproduct ib it calculates:

min[min(0+300,1000)−min(0+1000,1000),0]*Via=−700*Via

Thus if company Dzeng uses For. 3 to determine whether a negative variance occurred in assemble process 6 because of incomplete input, company Dzeng calculates that a negative variance in revenues of −700*Via occurred in assemble process 6. This outcome is however false. No negative variance in revenues occurred in assemble process 6. In fact no negative variance in revenues occurred in the whole production and selling of product i. Total sales were 1000 units of product i, which equals total market demand of product i. Thus the outcome of the formulas, described in Netherlands Pat. No. 1000191 can lead to a false determination of bottlenecks.

With the foregoing description of the related art in mind, it will be recognized that there are deficiencies in the prior art. For example, there is a need for a method and apparatus for determining bottlenecks properly in order to allocate investments. The prior art methods suffer from not being able to determine bottlenecks in processes without a certain fixed maximum production capacity. The prior art methods also suffer from not being able to properly determine bottlenecks when it is hard or impossible to determine how much time each bottleneck spends on each particular (type of) product. The prior art methods also suffer from not being able to properly determine bottlenecks when it is hard or impossible to determine the maximum speed of each bottleneck.

SUMMARY

According to the present invention a system is provided which allows for determining bottlenecks in a business by defining sequential processes and quantifying certain attributes for each process. These attributes may include a production amount, a beginstock amount and a spoilage amount. This way a business may properly determine bottlenecks in processes which do not have a certain fixed maximum production capacity and in processes for which it is hard or impossible to determine how much time it spends on each product and in processes for which it is hard or impossible to determine its maximum speed.

BRIEF DESCRIPTION OF THE DRAWINGS

For a fuller understanding of the nature and objects of the invention, reference should be made to the following detailed description taken in conjunction with the accompanying drawings, in which:

FIG. 6 shows a computer screen that may be used for the entry of data of products according to an embodiment of the present invention.

FIG. 9 shows a computer screen that may be used for the entry of data of a particular process according to an embodiment of the present invention.

FIG. 15A illustrates a table with data on processes according to an embodiment of the present invention whereby the table with data on processes holds data on processes which take place in a factory.

FIG. 15B illustrates the selecting and sorting of records with data on processes according to an embodiment of this invention whereby the records with data on processes holds data on processes which take place in a factory.

DETAILED DESCRIPTION OF THE INVENTION

An embodiment of the invention will be described with reference to a particular factory. It should be noted that reference is made from time to time herein to a product of a process, and that a process may not result in a physical change. For example, if the process is the sale of a dress hanger, then the product of the prior process may be an unsold dress hanger, while the product of the sales process may be a sold dress hanger.

Figure 3:
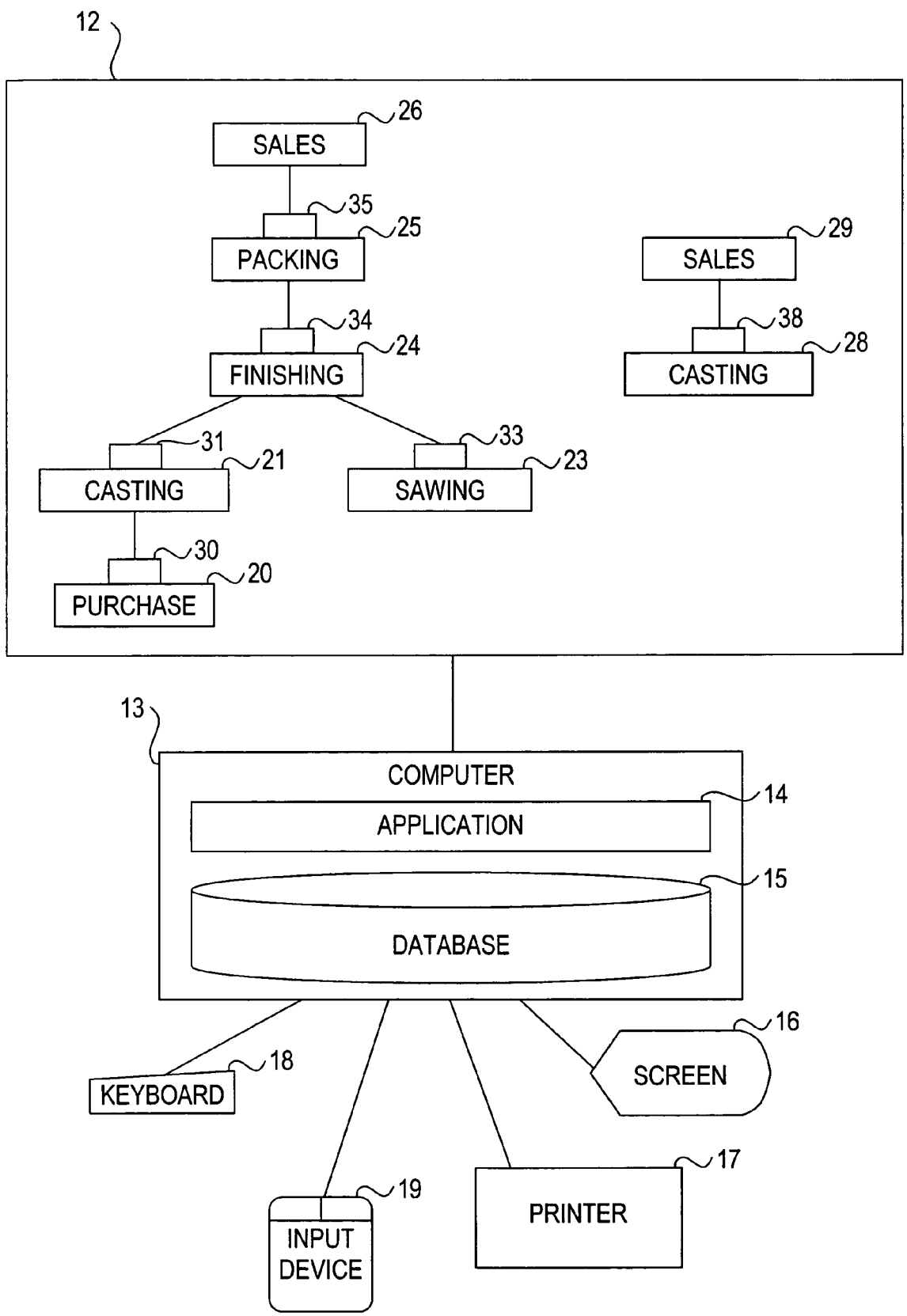
FIG. 3 is a block diagram which shows an embodiment of the present invention applied to a factory.

FIG. 3 illustrates an embodiment of the invention applied to factory Z. In factory Z several processes are involved in the production and selling of products. In this embodiment of the invention, a process is a particular part of the production and selling of a product. For example, processes 20, 21, 23, 24, 25 and 26 are parts of the production and selling of a dress hanger. Processes 28 and 29 are parts of the production and selling of a shoehorn. One or more processes have a direct relationship. For example purchase process 20 delivers iron to casting process 21. Casting process 21 accepts this iron directly from purchase process 20 as input. Purchase process 20 is the inputting process of casting process 21. Casting process 21 is the next process of purchase process 20. Another example is the relationship between finishing process 24 and casting process 21 and sawing process 23. Finishing process 24 accepts (unfinished) products directly from casting process 21 and from sawing process 23. Finishing process 24 has two inputting processes. Casting process 21 and sawing process 23 are the two inputting processes of finishing process 24. Finishing process 24 is the next process of casting process 21 and finishing process 24 is the next process of sawing process 23. Another example is the relationship between packing process 25 and finishing process 24. Finishing process 24 is the inputting process of packing process 25, because packing process 25 accepts directly products from finishing process 24. Packing process 25 is the next process of finishing process 24.

The iron which was purchased by purchase process 20 before the beginning of a time period, which has not been processed yet by casting process 21 at the beginning of that period, forms the beginstock 30 of purchase process 20. The beginstock 31 includes the (unfinished) dress hangers which were processed by casting process 21 before the beginning of the time period, which were not processed yet by finishing process 24 at the beginning of that period. Beginstock 31 forms the beginstock of casting process 21. The dress hangers that were processed by finishing process 24 before the beginning of a period, which were not packed yet at the beginning of that period, forms the beginstock 34 of finishing process 24. The dress hangers that were packed by packing process 25 before the beginning of the time period, which were not sold yet by sales process 26, forms the beginstock 35 of packing process 25. The wood which was processed by sawing process 23 before the beginning of the time period but which was not yet processed by finishing process 24 at the beginning of that time period forms beginstock 33 of sawing process 23. The casted shoehorns that were processed by casting process 28 before the beginning of a period, which were not yet sold by sales process 29 at the beginning of that period, forms the beginstock 38. Beginstock 38 is the beginstock of casting process 28.

A personal computer 13 may be programmed to receive information regarding products and processes. The information of products and processes may be inputted by the user using a keyboard 18 or another input device 19. Input device 19 may be a mouse. Personal computer 13 may be further programmed to store data of products and processes in a database 15 and to determine bottlenecks and prepare a report using a custom application 14. Once the bottlenecks have been determined, a report which summarizes the bottlenecks may be displayed on a screen 16 or printed out on a printer 17. This report may be used to determine in which processes an investment should be made, and what the maximum costs of such an investment should be in order to be profitable.

Custom application 14 comprises specially written program code which interacts with a commercially available database 15, such as Access (available from Microsoft). Custom application 14 and database 15 may operate in a Windows environment. The precise operating system and database are not crucial to the invention. The database, the custom application and its interactions with the database will now be described in detail, it being understood that it is within the capabilities of a person of ordinary skill in the art to write the computer code needed to implement the invention.

Figure 4:
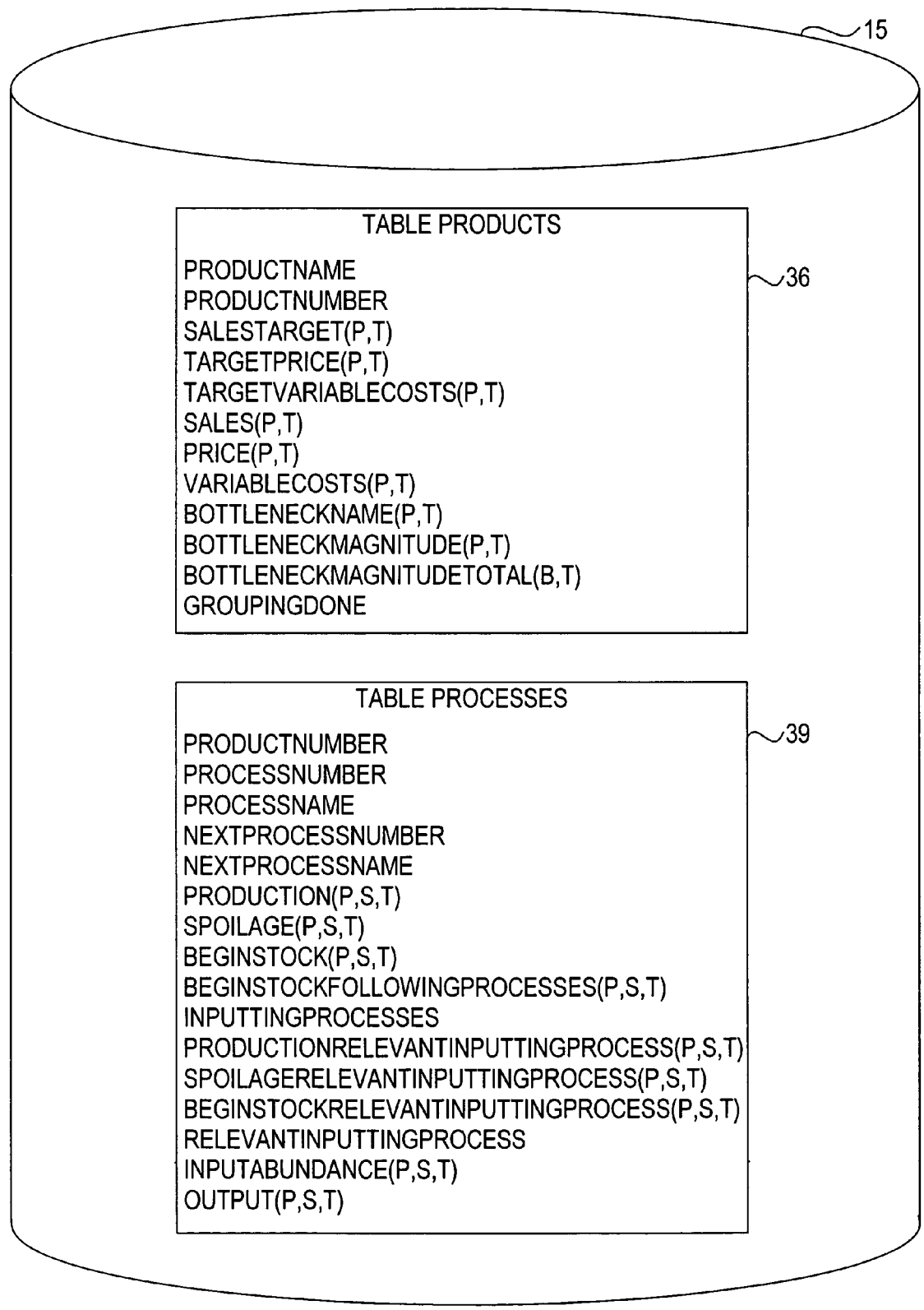
FIG. 4 illustrates the data structure of the database according to an embodiment of the present invention.

In FIG. 4 an exemplary data structure of database 15 is illustrated. Database 15 may include two tables: table 36 and table 39. In an embodiment of the invention, a record corresponding to each product is stored in table 36. Each record may include properties of the concerned product. The properties of the product which are stored in the record may relate to a past time period. Each product should be uniquely identified, preferably by a product name or product number.

In an embodiment, the sales target for product p during period t ("SalesTarget(p,t)") may be equal to the market demand of product p during period t. In another embodiment of this invention the sales target may be based on the pursued production or pursued sales. SalesTarget(p,t) may be expressed in units of products. The target price of product p during period t ("TargetPrice(p,t)") may be equal to the pursued selling price for product p during period t and may be expressed in US Dollars, EURO's or another currency. The price of product p during period t ("Price(p,t)") may be equal to the average selling price of product p during period t and may be expressed in US Dollars, EURO's or another currency. The variable costs of product p during period t ("VariableCost(p,t)") may be equal to the average marginal costs of producing an additional unit of product p. VariableCost(p,t) may be expressed in US Dollars, EURO's or another currency. The target variable costs of product p during period t ("TargetVariableCost(p,t)") may be equal to the pursued marginal costs of producing an additional unit of product p. TargetVariableCost(p,t) may be expressed in US Dollars, EURO's or another currency. The sales for product p during period t ("Sales (p,t)") may be equal to the amount of products p which were sold by a business during a period t. Sales(p,t) may be expressed in units of products.

The name of the bottleneck in the production and selling of product p during period t may be expressed in "BottleneckName(p,t)." The magnitude of the bottleneck in the production and selling of product p during period t ("BottleneckMagnitude(p,t)") may be an estimation of the part of the targeted sales of product p that were not fetched because of the appearance of the bottleneck in the production and selling of product p. BottleneckMagnitude(p,t) may be expressed in units of products. The total magnitude of bottlenecks which occurred in part b of the business during period t ("BottleneckMagnitudeTotal(b,t)") may be an estimation of the targeted sales that were not fetched because one or more bottlenecks occurred in part b of the business during period t. The total magnitude of bottlenecks will be discussed later. BottleneckMagnitudeTotal(b,t) may be expressed in units of products, in selling prices or in gross margin. A parameter referred to herein as "GroupingDone" may indicate whether the value of BottleneckMagnitudeTotal(b,t) is determined and stored in the concerned product record. If GroupingDone is false then the value of BottleneckMagnitudeTotal(b,t) is not yet determined and stored in the concerned product record. If GroupingDone is true then the value of BottlenecksMagnitudeTotal (b,t) is determined and stored in the concerned product record.

In an embodiment of this invention, for each product, for which the data is stored in table 36, one or more processes may be defined. For each defined process a record may be stored in table 39. Thus for each part of the production and selling of each product, a record may be stored in table 39. Factory Z, illustrated in FIG. 3 defined 6 processes in the production and selling of the dress hanger. Factory Z also defined 2 processes in the production and selling of the shoehorn. In table 39 there are 8 process records stored for factory Z: one for each defined process. The name of each process may relate to the part of the business, where the process takes place. For example, the process of purchasing in the production and selling of the dress hanger by factory Z for instance is called "Purchase" because this process takes place in the purchase department of factory Z, and the casting of shoehorns in the production and selling of shoehorns by factory Z is called "Casting" because this process takes place in the casting department.

In each record the properties of the concerned process may be stored. The properties of the processes which are stored in the record may relate to a past time period. The number of the concerned product (product "p" for short, hereinafter) may be stored in field "ProductNumber". Each process may be uniquely identified by a process number. This unique process number may be stored in the field "ProcessNumber". The next process of the concerned process may be identified by a number ("NextProcessNumber") and name ("NextProcessName"). The production of product p by process s during period t ("Production(p,s,t)") may be the amount of products p which were processed by process s during period t and may be expressed in units of product p. The spoilage of product p which occurred directly after process s during period t ("Spoilage(p,s,t)") may be the amount of units of product p that were discarded directly after process s during period t and may be expressed in units of product p. The begin stock of product p which was present at process s at the beginning of period t ("BeginStock(p,s,t)") may be the amount of units of products p that were already processed by process s before the beginning of period t but were not processed yet by the next process of process s. The beginstocks of product p which were present at the beginning of period t at the next process of process s and other following processes of process s ("BeginStockFollowingProcesses(p,s,t)") may be the amount of units of products p that were processed by the next process of process s before the beginning of period t but were not yet processed by all the following processes which processes the production of process s. The number of inputting processes may be stored in table 39 in each process record in the field "InputtingProcesses". Other important terms, that are discussed below, include the relevant inputting process ("RelevantInputtingProcess"), the production of this relevant inputting process ("ProductionRelevantInputtingProcess(p, s,t)") its spoilage ("SpoilageRelevantInputtingProcess(p,s,t) ") and its begin stock ("BeginStockRelevantInputtingProcess (p,s,t)"). The difference between the input and the net production of process s during period t ("InputAbundance(p, s,t)") and the production of process s which was processed by process s, and which could be used in the production and selling of product p during period t ("Output(p,s,t)"), will also be discussed later.

Figure 5:
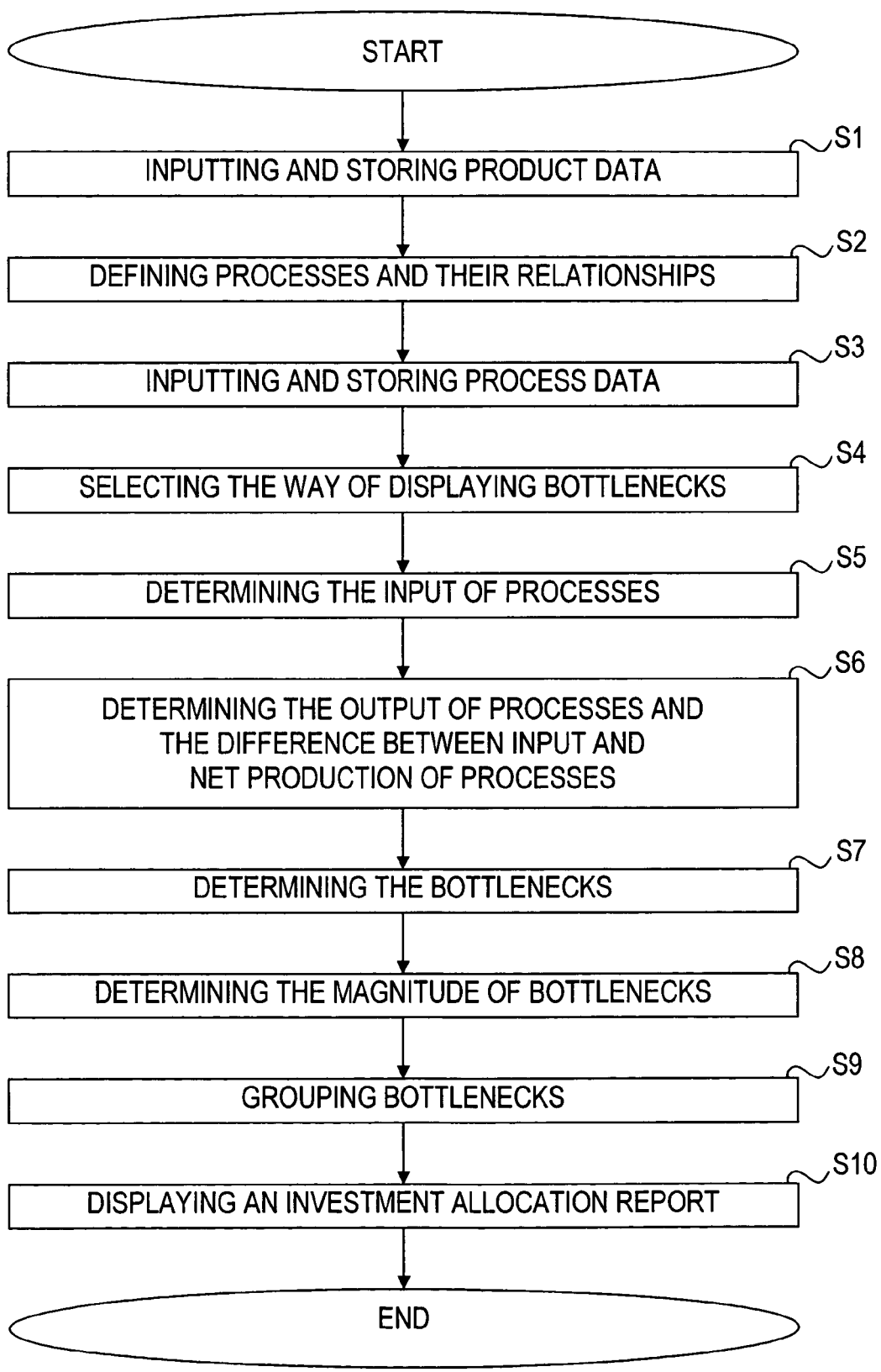
FIG. 5 is a flowchart which shows the basic steps that may be taken according to an embodiment of the present invention.

Basic steps of an exemplary embodiment are shown in FIG. 5. First, product data may be inputted to the computer and stored into table 36 in basic step S1. Next, the processes and their relationships may be defined in basic step S2. Process data may be inputted in the computer and stored into table 39 in basic step S3. The user may select the way to display the bottlenecks in basic step S4. In basic step S5 the input of processes may be determined. Then the output of processes may be determined as well as the difference between the input and the net production of processes in basic step S6. In basic step S7 the bottlenecks may be detected. The magnitude of the bottlenecks may be determined in S8. In basic step S9 the bottlenecks which occurred in the same part of the business may be grouped together. In basic step S10 the investment allocation report, summing all the bottlenecks and their total magnitude, may be displayed to the management of a business. Each of these steps will now be described in detail.

S1 Inputting and Storing Product Data

FIG. 6 is a snapshot of a product data entry screen 40 of custom application 14 according to an embodiment of the invention. For each product, the user may enter the product data in this screen. For each product, a record may be formed in table 36 in database 15. To add a product record, the user may click pointing device 19 on the Add Record button 41. The user may type the name of product p in text box 44. The user may type the sales target of product p during period t, SalesTarget(p,t) in text box 45. The user may type the average selling price of product p during period t (Price(p,t)) in textbox 46 and the pursued selling price of product p during period t (TargetPrice(p,t)) in textbox 47. The user may type the average variable costs of product p during period t (VariableCosts(p,t)) in text box 49 and the pursued variable costs of product p during period t (TargetVariableCosts(p,t)) in text box 48. After confirming the entries, custom application 14 may add a new product record in table 36 of database 15. When a product record is added to table 36, application 14 may generate a unique number for the concerned product and store this number in this product record in field "ProductNumber". The product data in text box 44 may be stored in field "ProductName" of the new added product record. The product data in text box 45 may be stored in field "SalesTarget (p,t)" of the new added product record. The product data in text box 46 may be stored in field "Price(p,t)" of the new added product record. The product data in text box 47 may be stored in field "TargetPrice(p,t)" of the new added product record. The product data in text box 48 may be stored in field "TargetVariableCosts(p,t)" of the new added product record. The product data in text box 49 may be stored in field "VariableCosts(p,t)" of the new added product record. The name of the product for which a new product record is added to table 36, may be displayed in product list 50. To change the product data, the user may first select the product in product list 50 by clicking pointing device 19 on the name of the product for which the data must be changed. Then, the user may click pointing device 19 on the Change Record button 43 and change the product data in the textboxes 44, 45, 46, 47, 48 and 49. After confirming, the changed product data may be stored in table 36 in database 15. To delete a product record, the user may first select the product in product list 50 by clicking pointing device 19 on the name of that product. Then the user may click pointing device 19 on the Delete Record button 42, which will cause the product record to be deleted from table 36. If the user wants to see the processes which are involved in the production and selling of a product, he or she may click pointing device 19 on the Show product processes button 51.

S2 Defining Processes and Their Relationships

As stated above, a process may be a particular part of the production and selling of a product. Processes contribute to the production and selling of that product. In an embodiment of the invention, for each product for which the data is stored in table 36, one or more processes which contribute to the production and selling of that product may be defined. If a process is defined in the production and selling of a particular product, this process may be defined in such a manner that it must contribute to the production and selling of each unit of the concerned product. Thus, if a process is defined in the production and selling of a particular product, this process may be defined in such a manner that every sold product has been acted on by the concerned process. A way of accomplishing this is to define processes such that the product of one process is used as input by only one other process. For example packing process 25, illustrated in FIG. 3 contributes to the production and selling of each dress hanger. If packing process 25 does not contribute to the production and selling of a dress hanger then this dress hanger will not be sold. No other defined process can do the packing of the dress hanger. As another example of how the processes may be defined, sawing process 23 has to saw the wood for each dress hanger. If sawing process 23 does not saw the wood of the dress hanger then the dress hanger is not complete and can not be sold as a dress hanger. No other defined process can do the sawing of the wood for the dress hanger.

If a process is defined in such a manner that it does not have to contribute to the production and selling of each unit of the concerned product, then this process may be redefined in another manner, or that process may not be defined at all. Take for instance the example of a factory, where two different processes which both purchase wood are defined in the production of product W. These two processes both purchase wood and deliver the same kind of wood to the same sawing process. Sometimes the first purchase wood process delivers wood in the production of a unit of product W, and another time the second purchase wood process delivers wood in the production of a unit of product W. In this case the two purchase wood processes are defined in such a manner that they do not have to contribute to the production and selling of each unit of product W. If for instance the first purchase wood process, purchases the wood for one unit of product W and delivers this wood to the sawing process, then the second purchase wood process does not have to contribute to the production and selling of this unit. In order to define only processes which have to contribute to each unit of product W, the two purchase processes should be defined in another manner. In this case only one purchase wood process should be defined in the production and selling of product W. The activities which were formerly defined by the two purchase wood processes may be defined by defining just one purchase wood process. Then only one purchase wood process may be defined, which have to contribute to the production and selling of each unit of product W. Thus according to this embodiment of the invention, for each product, processes may be defined which must contribute to each unit of that product. The processes which are defined by the user of this invention do not have to have a certain fixed maximum production capacity or a maximum speed. The processes which are defined by the user can also be processes for which it is hard or impossible to determine how much time it spends on each particular (type of) product.

The relationships between the processes may be defined. The defining of the relationships between the processes may include defining which process uses the production of which other process as input. In other words, the defining of the relationships between the processes may include defining which process is the next process of which other process and defining which process is the inputting process of which other process. For each product, only one process may be defined as the last process in the production and selling of that product. This last process may be defined in such a manner that the production of this process is not used as input for any other process. For this last process, no next process is defined. Each process, which is not the last process in the production and selling of a product, may be defined in such a manner that the production of this process is used as input by only one other next process. In other words, if a process is not defined as the last process in the production and selling of a product, then for this process only one next process is defined.

Thus, the processes which are involved in the production and selling of a product and their relationships may be defined in such a manner that:

for each product, only processes are defined which have to contribute to each unit of that product;

for each product, only one process is defined as the process, which has a production that is not used as input for another process and;

if the production of a process is processed by another process, then its production is used as input for only one other next process.

Figure 1:
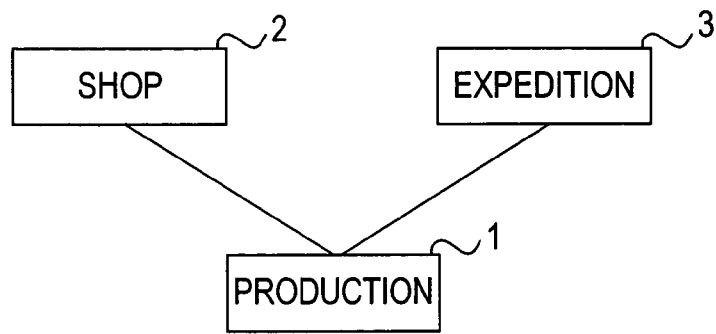
FIG. 1 illustrates a method of determining bottlenecks according to prior art.
Figure 2:
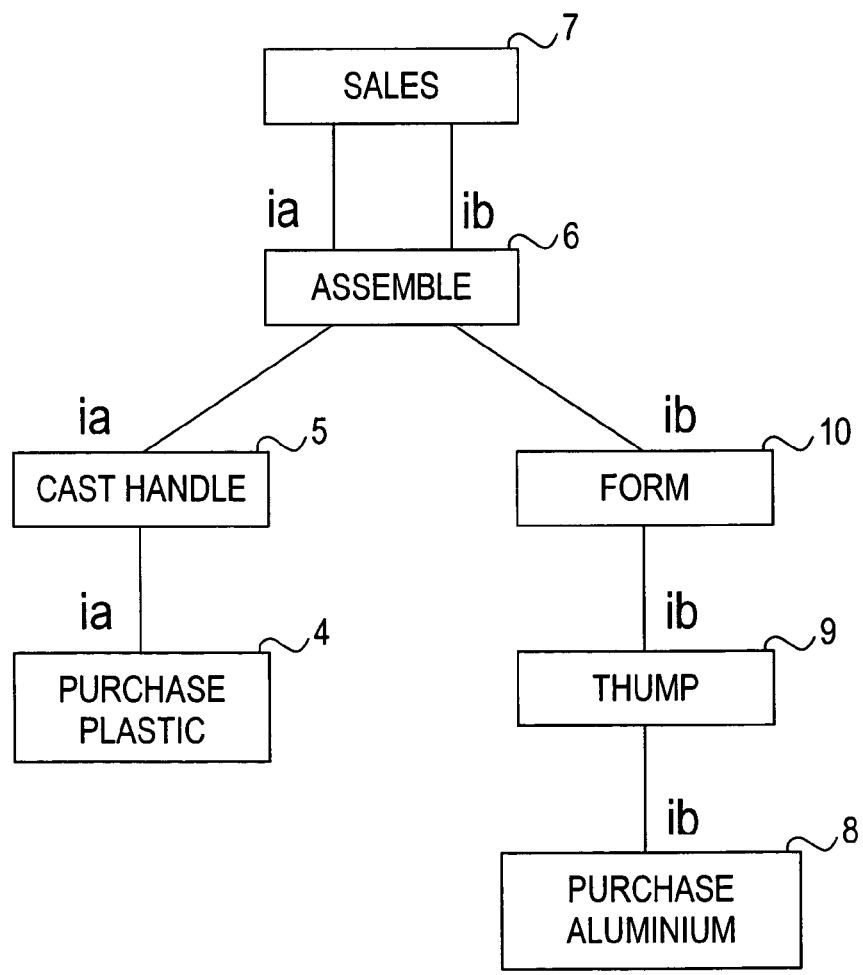
FIG. 2 illustrates a method of determining bottlenecks according to prior art.

For ease of understanding consider company Y, illustrated in FIG. 1. Company Y produces and sells only one product. The production of shop 2 and the production of expedition 3 are not used as input for another process. According to an embodiment of the invention however, for each product, only one process may be defined as the process, which has a production that is not used as input for another process. In order to define only one process which has a production that is not used as input for another process, one sales process is defined which includes the activities of the shop and the expedition department. Also consider the example of a purchase department which delivers plastic to production process P and ink to production process Q. The production of the purchase department is used as input for two next processes. According to an embodiment of the present invention however the processes and their relationships may be defined in such a manner that if the production of a process is processed by another process, its production is used as input for only one other next process. In order to achieve this, two purchase processes are defined. One purchase process is defined as the purchase plastic process which delivers plastic to production process P and a second purchase process is defined as the purchase ink process which delivers ink to production process Q. In this manner, the production of the purchase plastic process is used as input for only one other next process, namely production process P and the production of the purchase ink process is used as input for only one other next process, namely production process Q.

Figure 7:
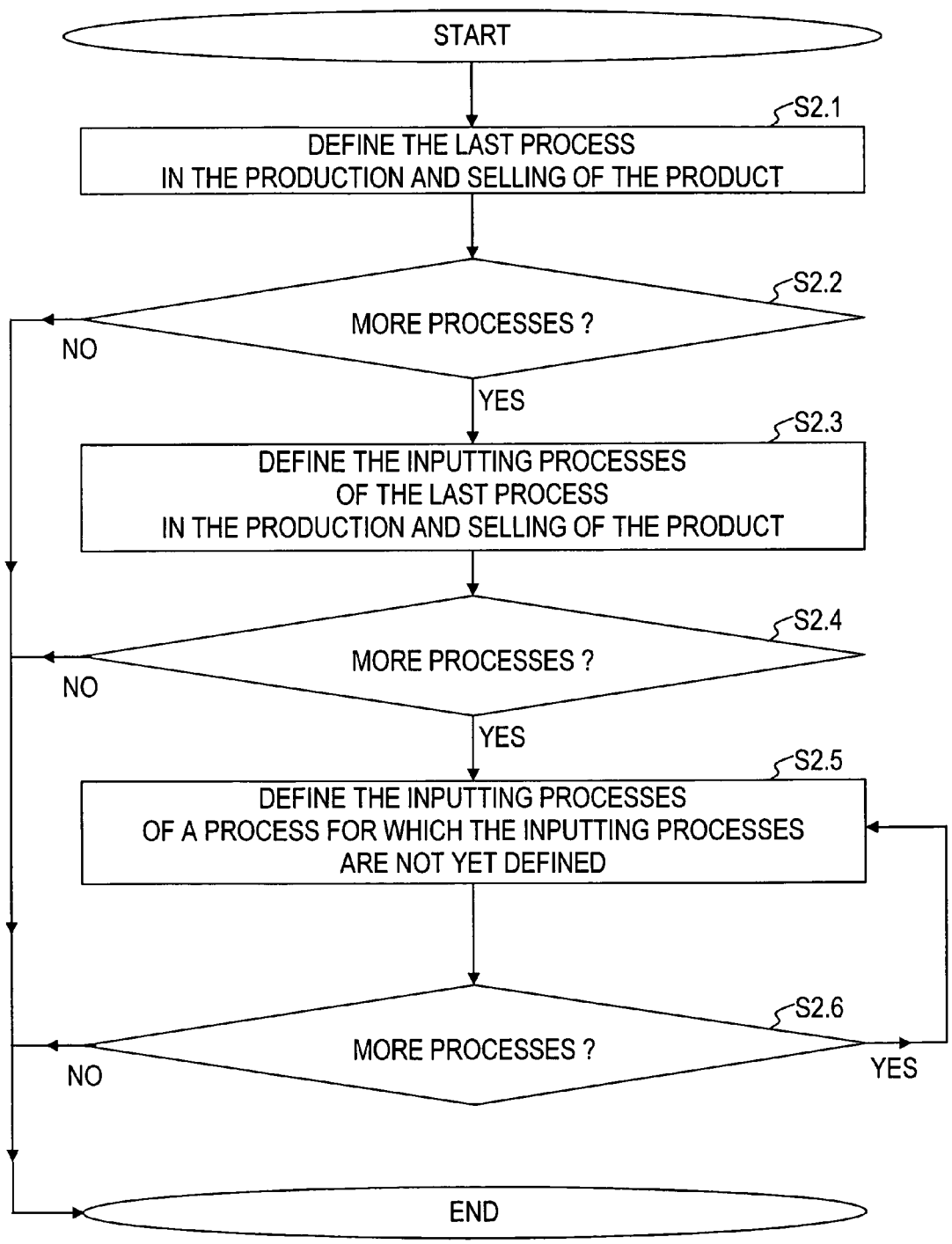
FIG. 7 illustrates the defining of processes and their interrelationships according to an embodiment of the present invention.

FIG. 7 shows steps of defining the processes and their interrelationships, according to an embodiment of the invention. In the embodiment the basic step S2 includes the detailed steps S2.1, S2.2, S2.3, S2.4, S2.5, and S2.6 which may be performed for each product, for which the data may be stored in database 15.

In detailed step S2.1 the user may define only one process as the process, which has a production that is not used as input for another process. This process is the last process in the production and selling of the concerned product. This last process may be defined in such a manner that it must contribute to each unit of the concerned product. In detailed step S2.2 the user may determine whether there are more processes to be defined, which are involved in the production and selling of the concerned product. If there are no more processes to be defined for the concerned product, then the defining of the processes and their relationships for the concerned product is finished. If there are more processes to be defined for the concerned product, then the user may define the inputting process(es) of the last process in detailed step S2.3. In other words, in detailed step S2.3 the user may define all the processes for which the last process is the next process. This may be done in such a manner that each defined inputting process is the inputting process of only the last process, and each defined inputting process must contribute to each unit of the concerned product. After defining the inputting process(es) of the last process the user may determine whether there are more processes to be defined, which are involved in the production and selling of the concerned product in detailed step S2.4. If there are no more processes to be defined for the concerned product, then all the processes and their relationships are defined for the concerned product. If there are more processes to be defined for the concerned product, then the user may define in detailed step S2.5, the inputting process (es) of a process which is involved in the production and selling of the concerned product and for which the inputting processes are not yet defined. This may be done in such a manner that each defined inputting process is the inputting process of only one other next process and each defined inputting process has to contribute to each unit of the concerned product. In detailed step S2.6 the user may determine if there are more processes to be defined, which are involved in the production and selling of the concerned product. If there are no more processes to be defined for the concerned product, then the defining of the processes and their relationships for the concerned product is finished. If there are more processes to be defined for the concerned product, then the user may define in detailed step S2.5 the inputting process(es) of another process which is involved in the production and selling of the concerned product and for which the inputting processes are not yet defined.

S3 Inputting and Storing Process Data

According to an embodiment of the invention, for each defined process, data may be inputted in computer 13 and stored into table 39 in database 15. There may be no need to gather data on maximum production capacities of processes or data on the time which processes spend on particular products or data on the maximum speed of processes. In the present invention, it may be sufficient that the data which is inputted to the computer for each process is the name of the process, the number of inputting processes, the amount of production, the amount of spoilage and the stocks that were present at the beginning of the concerned period.

To enter this process data the user may select the product for which the process data is desired to be entered. To do this the user selects a product in product list 50, shown in FIG. 6, by clicking pointing device 19 on the name of the product. Then the user may click with pointing device 19 on the Show product processes button 51. That action may take the user into a process selecting screen 60 shown in FIG. 8. To return to the product data screen 40, shown in FIG. 6 the user may click on the Show product data button 61.

Figure 8:
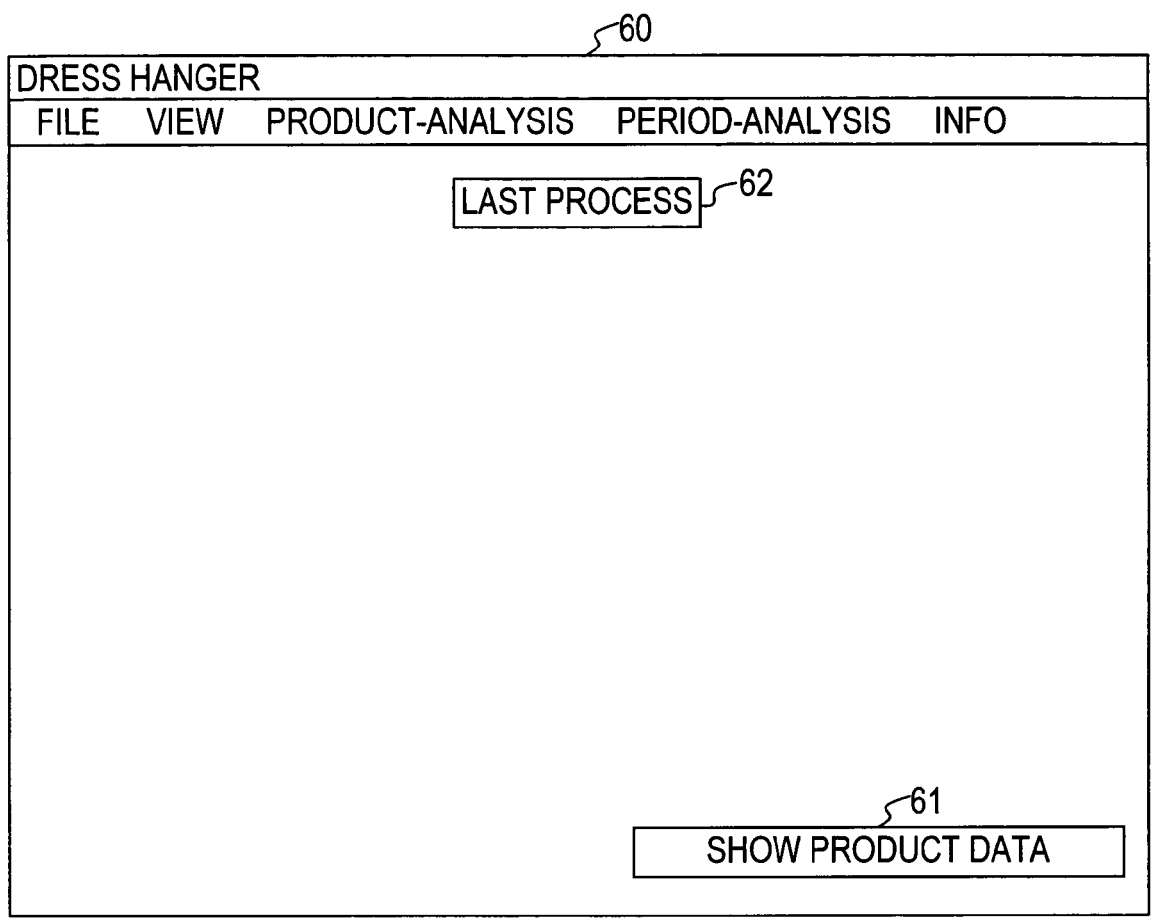
FIG. 8 shows a computer screen that may be used for selecting a particular process according to an embodiment of the present invention.

In the process selecting screen 60 shown in FIG. 8 the processes which were involved in the production and selling of the selected product may be displayed. Custom application 14 may check whether there is at least one process record in table 39 for the selected product, before it shows the process selecting screen 60. If no process record for the selected product exists, then custom application 14 may add one record for the last process of the selected product to table 39 and the process selecting screen 60 shows only this one last process. When this process record is added to table 39, the application may generate a unique number for the concerned process, and store this number in this new process record in field "ProcessNumber". Furthermore the application may store the product number in this new process record in field "Product Number". To enter the data of this last process, the user may click pointing device 19 on the last process button 62. That action may take him or her into a process data entry screen 70 of custom application 14 according to an embodiment shown in FIG. 9. The user may type the name of the concerned process in text box 71. The user may type the production of the concerned process of product p during period t, Production(p,s,t) in textbox 73. If the concerned process did not produce a unit of product p during period t, then the production of the concerned process of product p during period t may deemed to be zero and the user may type the figure "0" in text box 73. The beginstock of product p which was present at the concerned process s at the beginning of period t, BeginStock(p,s,t) may be entered in textbox 74. If there was no beginstock of product p present at the concerned process at the beginning of period t, then the beginstock of the concerned process of product p during period t may deemed to be zero and the user may type the figure "0" in text box 74. The spoilage of the concerned process of product p during period t, Spoilage(p,s,t,) may be entered in text box 75. If the concerned process did not have any spoilage of product p during period t, then the spoilage of the concerned process of product p during period t may be deemed to be zero and the user may type the figure "0" in text box 75. The user may type the number of inputting processes in text box 72. If the concerned process did not have any inputting processes, then the number of inputting processes may be deemed to be zero and the user may type the figure "0" in text box 72. If the user does not want to save the entered process data, the user may click pointing device 19 on Cancel button 77. If the user wants to store the entries, he or she may click pointing device 19 on Save button 76. Then the entries for the concerned process may be stored in the new record in table 39 in database 15. Clicking Save button 76 or Cancel button 77 may bring the user back to the process selecting screen 60.

Figure 10:
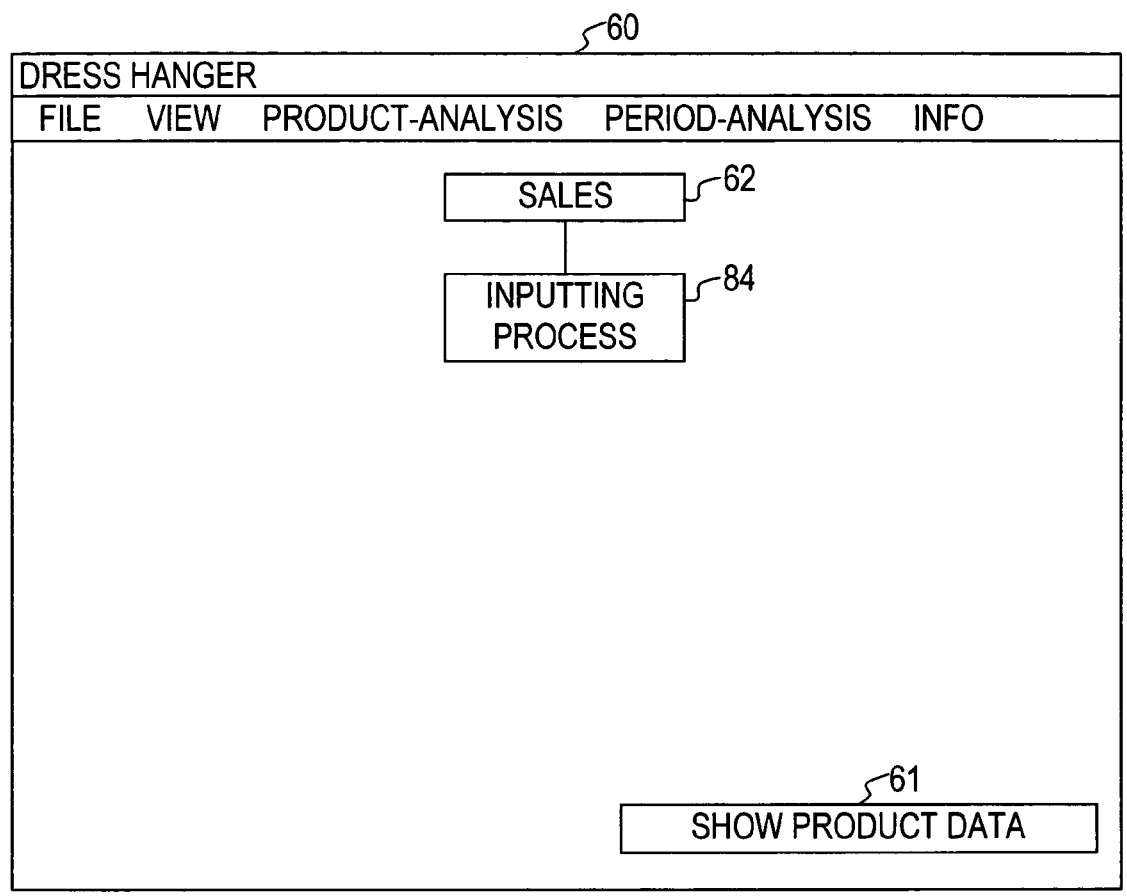
FIG. 10 shows a computer screen that may be used for selecting a particular process according to an embodiment of the present invention.
Figure 11:
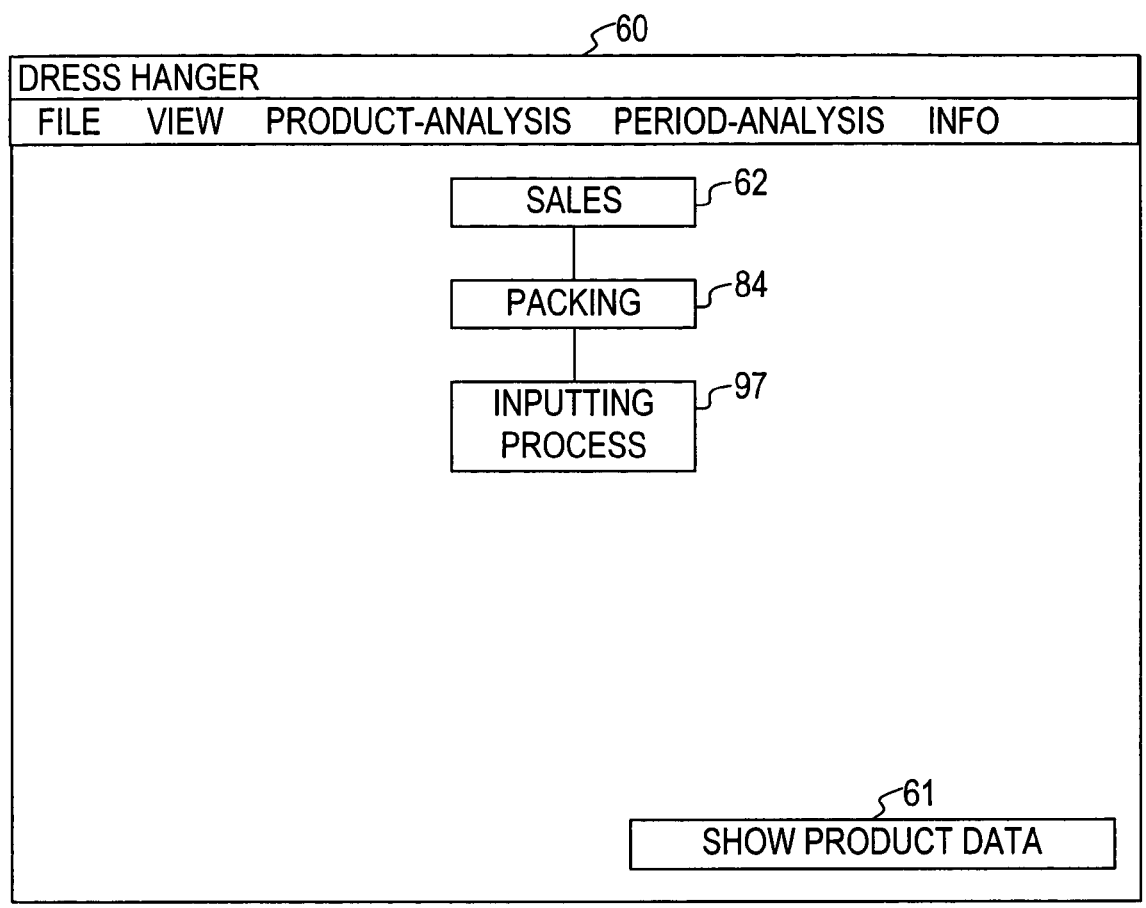
FIG. 11 shows a computer screen that may be used for selecting a particular process according to an embodiment of the present invention.

If the user entered in textbox 72, that the concerned process s has x inputting process(es), then custom application 14 may add x process record(s) to table 39, one for each inputting process. In the new process records of each inputting process of process s, custom application 14 may store the number of the concerned product in field "ProductNumber". In the new process records of each inputting process of process s, custom application 14 may store the number of process s in field "NextProcessNumber" and the name of process s in field "NextProcessName". Furthermore custom application 14 adds the value of field "BeginStock(p,s,t)" in the record of process s with the value of field "BeginStockFollowingProcesses(p,s,t)" in the record of process s. The outcome of this enumeration may be stored in the field "BeginStockFollowingProcesses(p,InputtingProcessA,t)" of the new process records of each inputting process of process s by custom application 14. When a process record is added to table 39, the application may generate a unique number for the concerned inputting process, and may store this number in this new process record in field "ProcessNumber". The process selecting screen 60 may show these inputting processes. If for instance the user entered in textbox 72, that the last process has one inputting process, custom application 14 may add 1 process record to table 39, and the process selecting screen 60 may show this inputting process, as illustrated in FIG. 10. To enter the process data of an inputting process s, the user may click pointing device 19 on the inputting process button 84. That action may take him or her into the process data entry screen 70 of custom application 14, which the user can use to enter the process data, the same way as he or she entered the data for the last process of the concerned product. If for instance the user enters in textbox 72, that the concerned process has one inputting process, custom application 14 may add one process record to table 39, store the number of the concerned process in the field "Next Process" of the new added process record and the process selecting screen 60 may show inputting process 97, as illustrated in FIG. 11. Clicking pointing device 19 on the Show product data button 61 may take the user back to the product data entry screen 40.

S4 Selecting the Way of Displaying Bottlenecks

Figure 12:
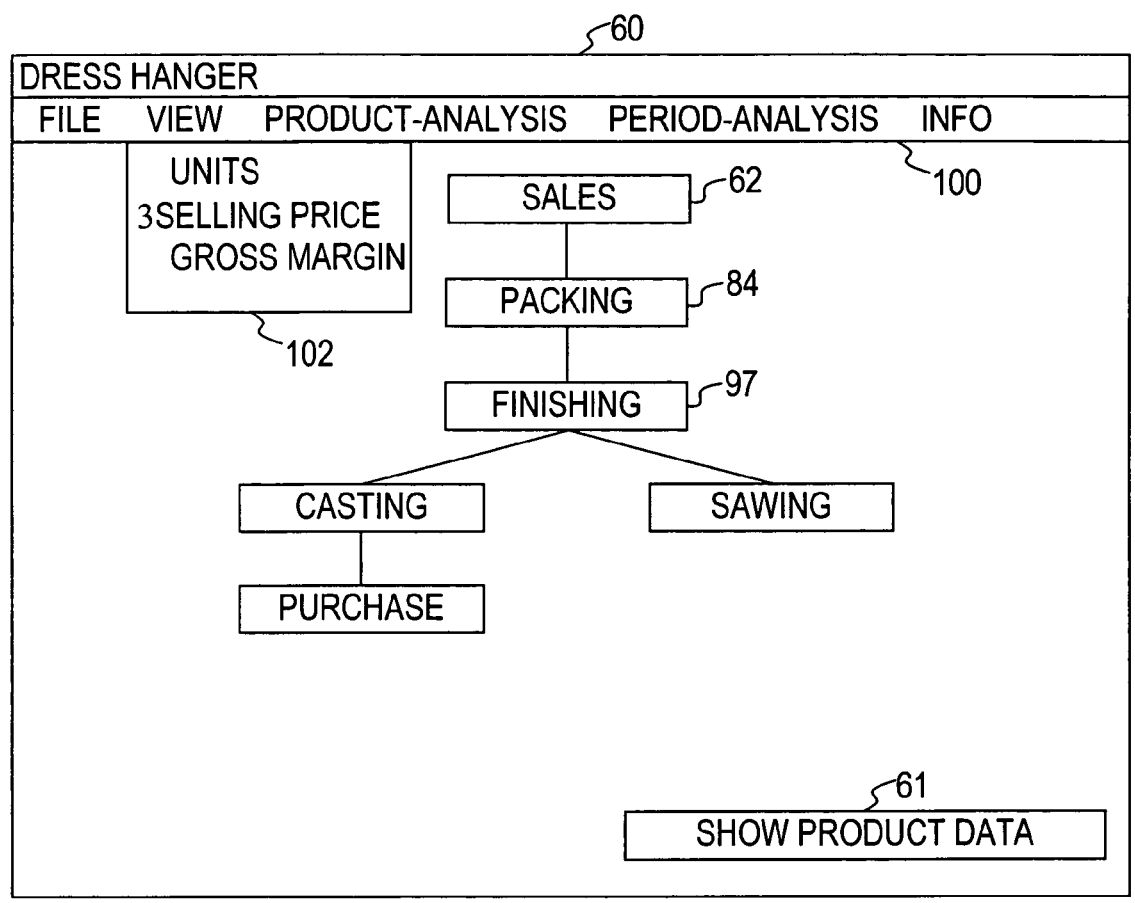
FIG. 12 shows a computer screen that may be used for selecting the way bottlenecks may be displayed according to an embodiment of the present invention.

FIG. 12 is a snapshot of a computer screen used for selecting a way of expressing bottlenecks according to an embodiment of the present invention. The magnitude of bottlenecks can be expressed in units of products, selling prices or gross margin. The user may click with pointing device 19 on the word "View" in menu bar 100 and pull down menu 102. The user may click on the word "Units" if he or she chooses to express the magnitude of the bottlenecks in units of products. The user may click on the word "Selling Price" if he or she chooses to express the magnitude of the bottlenecks in selling prices. The user may click on the word "Gross Margin" if he or she chooses to express the magnitude of the bottlenecks in gross margin. Custom application 14 may set the value of parameter "ExpressMode" to 1 if the user clicks on the word "Units", indicating that the magnitude of bottlenecks will be expressed in units of products. Custom application 14 may set the value of parameter "ExpressMode" to 2 if the user clicks on the word "Selling Price", indicating that the magnitude of bottlenecks will be expressed in selling prices. Custom application 14 may set the value of parameter ExpressMode to 3 if the user clicks on the word "Gross Margin", indicating that the magnitude of bottlenecks will be expressed in gross margin.

S5 Determining the Input of Processes

The next process of process s, may use the production of process s as input for its own production. The next process of process s, may also use the beginstock of process s as input for its own production. The next process of process s can however, not use the spoilage of process s as input for its own production. Thus the next process of process s may use the production of process s and the beginstock of process s as input, but the next process of process s can not use the spoilage of process s as input. In an embodiment of the invention, the production of process s plus the beginstock of process s minus the spoilage of process s may be expressed in the parameter NetOutput(p,s,t). The parameter NetOutput(p,s,t) may be calculated according to equation 1:

$$NetOutput(p,s,t) = Production(p,s,t) + BeginStock(p,s,t) - Spoilage(p,s,t) \qquad \text{(Equ. 1)}$$

The production of the next process of process s is not higher than the value of the NetOutput of process s. The next process of process s needs the input which it receives directly from process s, in the production of each unit of product p. As such, the production of product p of the next process of process s during period t is limited by the NetOutput of product p of process s during period t.

If the next process of process s has more than one inputting process in the production and selling of product p, then the next process of process s accepts products p directly from more than one inputting process. The next process of process s then combines the production of more than one inputting process. In order to process one unit of product p, the next process of process s, needs the input of each defined inputting process. This is because in defining the processes (including all the inputting processes of the next process of process s), the processes have been defined to contribute to the production and selling of each unit of product p. If one of the inputting processes of the next process of process s, has a low NetOutput, then the next process of process s can not produce more than this low value of NetOutput. The production of the next process of process s can never be higher than the NetOutput of the inputting process, which has the lowest value of NetOutput. The inputting process of the next process of process s which has the lowest value of NetOutput may be called the "relevant inputting process" to reflect the fact that this inputting process limits the production of the next process of process s. Thus the input which a process receives is equal to the input which that process receives from its relevant inputting process. If the next process of process s has only one inputting process, then this one inputting process (process s) is the relevant inputting process of the next process of process s.

For ease of understanding, consider the following example. During period t casting process 21, illustrated in FIG. 3, had a production of 85,000 dress hangers, a spoilage of 15,000 dress hangers and no beginstocks. Thus the NetOutput of casting process 21 during time period t was 70,000 dress hangers according to Equ. 1. Sawing process 23 had a production of 80,000 dress hangers, no spoilage and no beginstocks during period t. According to Equ. 1 the NetOutput of sawing process 23 during period t was 80,000 dress hangers. Finishing process 24 could only process 70,000 dress hangers during period t because the input which finishing process 24 accepts directly from sawing process 23 must be combined with the input which finishing process 24 accepts directly from casting process 21. Casting process 21 limited the production of finishing process 24 to 70,000 dress hangers during period t. In this example, casting process 21 is the relevant inputting process of finishing process 24.

Thus if process s has N inputting processes, then the input of process s may be equal to the NetOutput which process s receives from the inputting process with the lowest NetOutput. The input of process s can therefore be calculated according to Input($p,s,t$)=min(NetOutput($p$,InputtingProcessA,$t$), . . . , NetOutput($p$,InputtingProcessN,$t$))     (Equ. 2).

If a process has no inputting process in the production and selling of product p, then no input may be calculated for this process. Then the input may be deemed to be zero.

Figure 13:
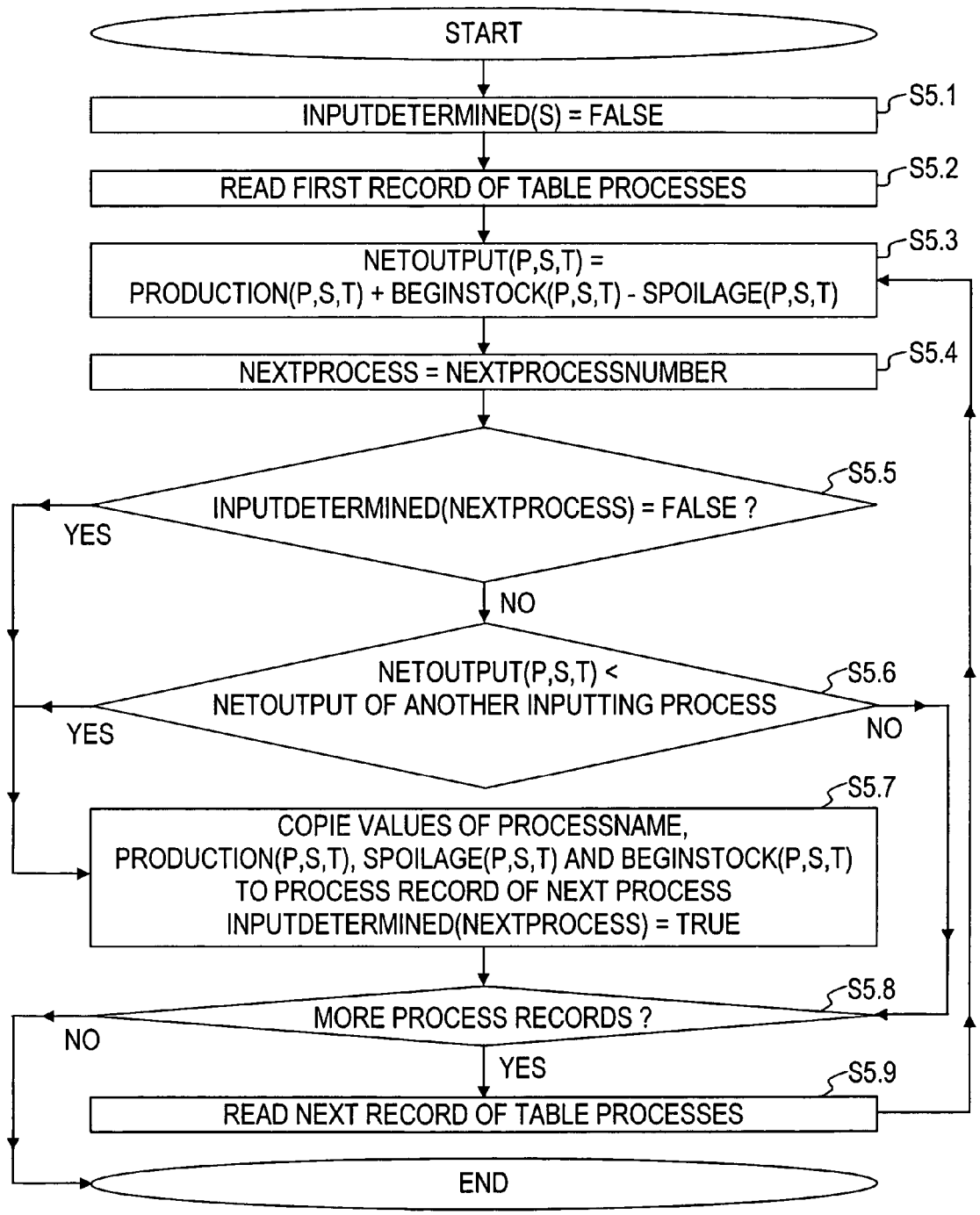
FIG. 13 is a flow chart showing the determination of the input of processes according to an embodiment of the present invention.

FIG. 13 shows steps that may be taken in order to determine the input of processes according to an embodiment of the invention. The basic step S5 may include the detailed steps S5.1, S5.2, S5.3, S5.4, S5.5, S5.6, S5.7, S5.8 and S5.9. Custom application 14 may calculate and store in table 39 the input of each process, for which a process record is stored in table 39 and which has one or more inputting processes. Custom application 14 may store for each process s the value of parameter InputDetermined(s) into the memory of computer 13. The parameter InputDetermined(s) may indicate for process s, whether the input of process s has been determined and stored in table 39 or not. For instance, if the value of InputDetermined(process1) is false then the input of process1 has not been determined and stored in table 39. And if for instance the value of InputDetermined(process2) is true then the input of process2 has been determined and stored in table 39. The value of parameter InputDetermined(s) is set to false for each process in detailed step S5.1, indicating that there is no process for which the input has been determined yet. Custom application 14 may start reading every process record in table 39, starting with the first record in step S5.2. After reading the fields "Production(p,s,t)", "Spoilage(p,s,t)" and "BeginStock(p,s,t)" in the process record of process s, custom application 14 may calculate the parameter NetOutput(p,s,t) according to Equ. 1 in process step S5.3. In step S5.4, custom application 14 may determine which process is the next process of process s by reading the field "NextProcesNumber" in the process record of process s. In step S5.5 custom application 14 checks whether an input of the next process of process s has already been determined and stored into table 39 by reading the value of parameter InputDetermined(NextProcess). If custom application 14 determines that the parameter InputDetermined(NextProcess) is false then custom application 14 may perform detailed step S5.7. If custom application 14 determines that the parameter InputDetermined(NextProcess) is not false then custom application 14 may perform detailed step S5.6.

In detailed step S5.6 custom application 14 may check whether the NetOutput of process s is lower than the NetOutput of another process for which custom application 14 has already determined that it is also an inputting process of the next process of process s. If custom application 14 determines that the NetOutput of process s is lower than the NetOutput of another process for which custom application 14 has already determined that it is also an inputting process of the next process of process s, then custom application 14 may perform detailed step S5.7. If custom application 14 determines that the NetOutput of process s is not lower than the NetOutput of another process for which custom application 14 has already determined that it is also an inputting process of the next process of process s then custom application 14 may perform detailed step S5.8. In detailed step S5.7 custom application 14 may copy the value of field "ProcessName" of process s to the field "RelevantInputtingProcess" in the process record of the next process of process s. In detailed step S5.7 custom application 14 may also copy the value in field "Production(p,t,s)" in the process record of process s to the field "ProductionRelevantInputtingProcess" of the process record of the next process of process s. In detailed step S5.7 custom application 14 may also copy the value in field "Spoilage(p,s,t)" in the process record of process s to the field "SpoilageRelevantInputtingProcess" of the process record of the next process of process s. In detailed step S5.7 custom application 14 may also copy the value in field "BeginStock(p,s,t)" in the process record of process s to the field "BeginStockRelevantInputtingProcess" of the process record of the next process of process s. And in detailed step S5.7 custom application 14 may set the value of InputDetermined(NextProcess) to true, indicating that an input for the next process of process s has been determined and stored in table 39.

In detailed step S5.8 custom application 14 may check whether there are records in table 39 which have not been read yet by custom application 14 during the current execution of step S5. If there are still process records which have not been read yet by custom application 14 during the current execution of step S5, then custom application 14 may read the next record of table 39 in detailed step S5.9. After reading the next record in detailed step S5.9, custom application 14 may continue with detailed step S5.3. After reading all the process records in table 39 and performing, for each process record the detailed steps S5.3, S5.4, S5.5, S5.6 and S5.7, the input of the processes may be stored in database 15. If process s does not have any inputting processes then the fields "ProductionRelevantInputtingProcess(p,s,t)", "SpoilageRelevantInputtingProcess(p,s,t)" and "BeginStockRelevantInputtingProcess(p,s,t)" of the process record for process s may still have their initial value.

S6 Determining the Output of Processes and the Difference Between Input and Net Production of Processes In order to determine which investments are profitable and which investments are not, it is important for a business to know, which processes are bottlenecks and which processes are not. The bottleneck of a product may be defined as a process with the lowest output of that product during a period and this low output is not a consequence of low input which that process received from an inputting process. In order to determine the bottlenecks, it may be necessary to determine the output of processes and to check whether the low output of processes is a consequence of low input. According to an embodiment of the present invention, the output of product p of process s during period t includes units of product p which were processed by process s and which could be used in the production and selling of product p during period t.

Using this definition, the production of process s during period t which was not discarded after process s, was processed by process s and could be used in the production and selling of product p during period t. The units of product p that were discarded after process s (spoilage), could not be used in the production and selling of product p during period t.

The beginstock of product p of process s includes units of product p which were processed by process s during a former period. These units were not processed yet by the following process of process s at the beginning of period t. These units could also be used in the production and selling of product p during period t, and are therefore part of the output of product p of process s during period t. For ease of understanding, consider the following example. During January sawing process 23, illustrated in FIG. 3, sawed wood for only 10,000 dress hangers. Thus sawing process 23 had a production of only 10,000 units of dress hangers. The market demand however was 100,000 dress hangers during January. The beginstock 33 of sawing process 23 included 110,000 units of dress hangers at the beginning of January. There were no other beginstocks present at the beginning of January. Sawing process 23 did not have any spoilage during January. Thus during January there was a total of 120,000 units of dress hangers which were all processed by sawing process 23, and could all be used in the production and selling of dress hangers during January. Sawing process 23 was not a bottleneck in the production and selling of dress hangers during January although sawing process 23 had a very low production. The output of sawing process 23 exceeded the market demand and therefore did not limit the amount of dress hangers that could be sold during January.

The beginstock of product p of the following process of process s includes units of product p which were processed by process s and by the following process of process s during a former period. These units were not yet processed by the following process of the following process of process s at the beginning of period t. Because the units in the beginstock of product p of the following process of process s were processed by process s and they could also be used in the production and selling of product p during period t, these units may therefore also be part of the output of process s during period t. In fact this beginstock of product p of the following process of process s may be an important part of the output of product p of process s during period t. For ease of understanding, consider the following example. During February sawing process 23, illustrated in FIG. 3, processed wood for only 20,000 dress hangers. Thus the production of sawing process 23 was only 20,000 units of dress hangers. The market demand however was 100,000 dress hangers. The beginstock 33 of sawing process 23 included 0 units of dress hangers at the beginning of February. The beginstock 34 of the following process of sawing process 23 however included 200,000 units of dress hangers. There were no other beginstocks present at the beginning of February. Sawing process 23 did not have any spoilage during February. Thus during February there was a total of 220,000 units of dress hangers which were all processed by sawing process 23 and which all could be used in the production and selling of dress hangers during February. Sawing process 23 was not a bottleneck in the production and selling of dress hangers during February although sawing process 23 had a very low production. The output of sawing process 23 exceeded the market demand and therefore did not limit the amount of dress hangers that could be sold during February.

All the units of product p which were present in the beginstocks of all the following processes of process s are units of product p which were processed by process s and which could be used in the production and selling of product p during period t. For ease of understanding consider the following example. During March sawing process 23, illustrated in FIG. 3, had a production of only 30,000 units of dress hangers while the market demand was 100,000 dress hangers. The beginstock 33 of sawing process 23 included 0 units of dress hangers at the beginning of March. The beginstock 34 of the following process of sawing process 23 included 30,000 units of dress hangers. The beginstock 35 of packing process 25 included 80,000 units of dress hangers. There were no other beginstocks present at the beginning of March. Sawing process 23 did not have any spoilage during March. In this case, during March there was a total of 140,000 units of dress hangers which were all processed by sawing process 23 and which all could be used in the production and selling of dress hangers during March. Although sawing process 23 had a low production, it was not a bottleneck in the production of dress hangers during March, because it did not limit the amount of dress hangers that could be sold during March. Thus according to this embodiment of the invention the output of process s of product p during period t is determined according to the equation:

$$\text{Output}(p,s,t) = \text{Production}(p,s,t) - \text{Spoilage}(p,s,t) + \text{BeginStock}(p,s,t) + \text{BeginStockFollowingProcesses}(p,s,t) \quad \text{(Equ. 3)}$$

According to this embodiment of the invention, the net production of a process is equal to the production of that process minus the spoilage of that process. Thus, the net production of process s of product p during period t is calculated according to the equation:

$$\text{NetProduction} = \text{Production}(p,s,t) - \text{Spoilage}(p,s,t) \quad \text{(Equ. 4)}$$

The net production of a process can of course never be higher than the total amount of input of that process. In other words the total amount of production minus spoilage of a process can never be higher than the total amount of production minus spoilage plus beginstock of an inputting process of that process. If an inputting process of process s, delivers a low input to process s, then process s can never have a higher total amount of net production, even if process s has an enormous production capacity. If a process should have a low net production which is equal to its input during a period, then its low net production and low output can be a consequence of the low input, and this process does not have to be a bottleneck. Here, in this embodiment of the invention, a check of every process is made to determine whether it has an inputting process and whether the net production of the process is equal to the input to that process, in the determination of bottlenecks.

Custom application 14 may store for each process s the value of parameter "InputAbundance(p,s,t)" in the process record of process s in table 39. The parameter "InputAbundance(p,s,t)" indicates for each process, whether its net production of product p was equal to its input of product p or not during period t. For instance, if the net production of process 1 of product p during period t was not equal to its input of product p during period t then the value of "InputAbundance (p,process1,t)" is not equal to zero. Further, if the net production of product p of process2 was equal to its input of product p, the value of "InputAbundance(p,process2,t) is equal to 0. Further, if process3 did not have any inputting processes, the value of InputAbundance(p,process3,t) may be deemed to be zero.

Figure 14:
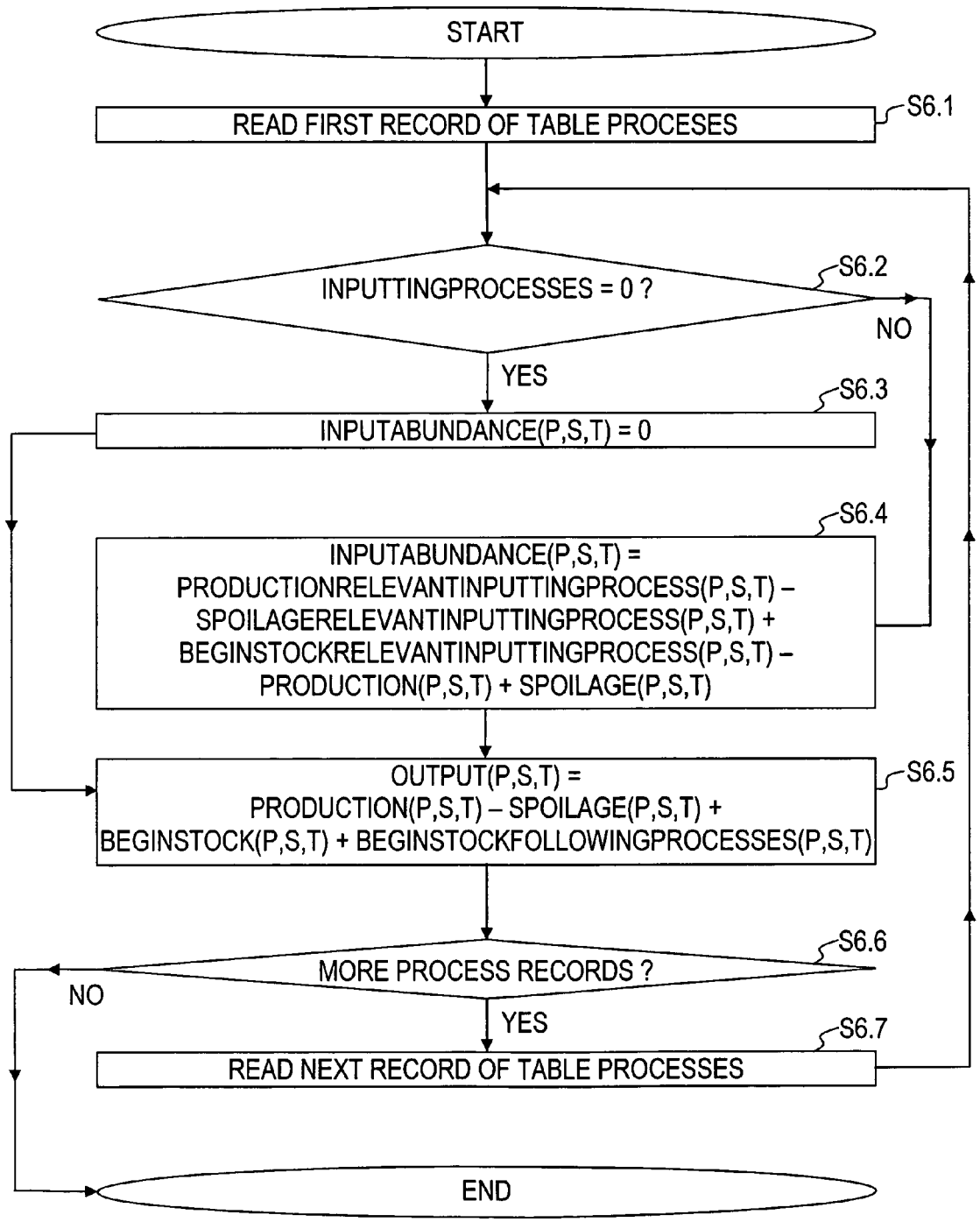
FIG. 14 is a flow chart showing the determination of the output of processes and the calculation of the difference between input and net production of processes according to an embodiment of the present invention.

FIG. 14 shows steps that may be taken in calculating the output of each process and checking for each process whether its net production is equal to its input. The basic step S6 may include the detailed steps S6.1, S6.2, S6.3, S6.4, S6.5, S6.6 and S6.7. According to this embodiment of the invention, custom application 14 may read every process record in table 39, starting with the first record in step S6.1. In step S6.2 custom application 14 may check whether the concerned process has one or more inputting processes, by reading the "InputtingProcesses" field of the current record. If custom application 14 determines that the concerning process has 0 inputting processes, then custom application 14 may perform the detailed step S6.3. In detailed step S6.3 custom application may store a value of 0 in the "InputAbundance" field of the current process record of the concerning process, because the concerning process does not have any input. If custom application 14 determines that the concerning process has one or more inputting processes, then custom application 14 may perform the detailed step S6.4. In detailed step S6.4 custom application 14 may calculate the value of InputAbundance(p, s,t) of the concerning process as the difference between the input of that process and the net production of that process. The value of InputAbundance(p,s,t) may be stored in the "InputAbundance" field of the current process record of the concerning process. In detailed step S6.5 custom application 14 may calculate the output of the concerned process according to Equ. 3. The output of the concerned process may be stored in the field "Output(p,s,t)" of the process record of the concerned process. In detailed step S6.6 custom application 14 may check whether there are process records in table 39 which have not been read yet by custom application 14 during the current execution of step S6. If there are still process records which have not been read yet by custom application 14 during the current execution of step S6, then custom application 14 may read the next record of table 39 in detailed step S6.7. If there are no process records which have not been read yet by custom application 14 during the current execution of step S6, then the fields "InputAbundance" and "Output" of every process record in table 39 is filled. These two values may be used to determine whether a process is a bottleneck or not.

S7 Determining the Bottlenecks

As stated above the bottleneck of a product may be defined as a process with the lowest output of that product during a period and this lowest output is not a consequence of low input which that process received from an inputting process. This lowest output limited the amount of products that could be sold during a time period. All the processes following the bottleneck could not process more products than this lowest output. If for instance a bottleneck has an output of only 600 units, then the following sales process can not sell more than these 600 units. Total sales of product p may be equal to the output of the bottleneck in the production and selling of product p. Increasing the production capacity of the bottleneck in the production and selling of product p by investing in its tools, staff or working methods can enhance sales of product p. If the investment is made in a process which is not the bottleneck in the production and selling of product p, then the sales of product p will not rise, because the sales of product p can never be higher than the lowest output of product p.

The shadowbottleneck of a product may be defined to be the process with the second lowest output of that product during a period and this second lowest output is not a consequence of low input which that process received from an inputting process.

In order to detect bottlenecks and shadowbottlenccks, custom application 14 may select and sort process records in table 39. Custom application 14 may select records of processes which have a (low) output that is not equal to and a consequence of (low) input which that process received from an inputting process. This may be done by selecting records of processes which have a netproduction that is lower than the input of that process and by selecting records of processes which do not have any preceding process. Custom application 14 may select these records by selecting records which have a value greater than 0 in the field "InputAbundance(p,s,t)" and records which have a value of 0 in the field "InputtingProcesses". The selected records may then be sorted in rising order by productnumber and output. This may be done by first sorting the selected records in rising order by productnumber. In this way, the records which refer to the same particular product number are grouped together in a recordgroup. Then within each recordgroup the records may be sorted in rising order by the value of the field "Output". FIG. 15A illustrates table 39 with all the process records which relate to the processes in factory Z during period t. FIG. 15B illustrates these records after selecting and sorting in rising order by the "ProductNumber" field and the "Output" field.

Figure 16:
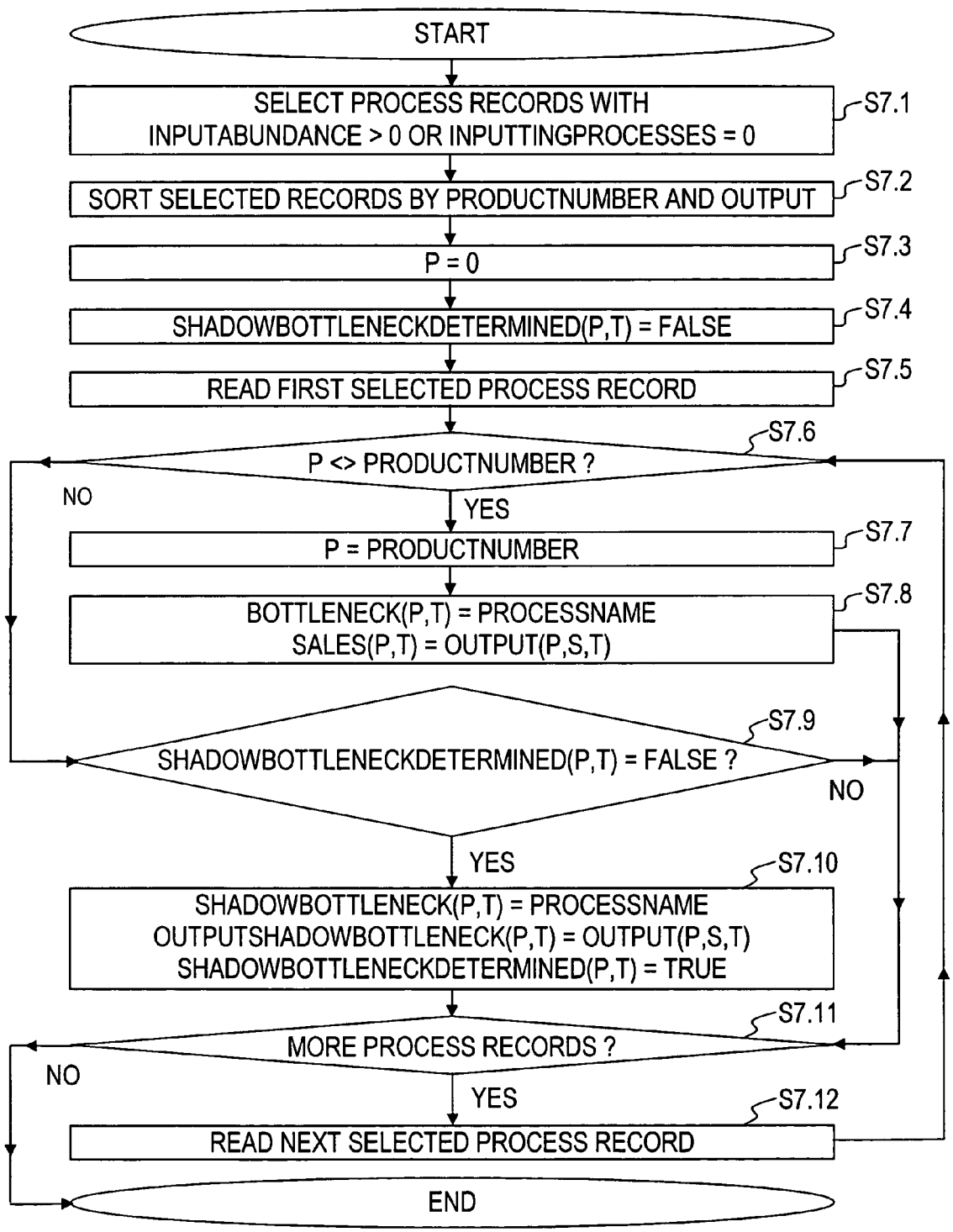
FIG. 16 is a flow chart showing the determination of the bottlenecks according to an embodiment of the present invention.

FIG. 16 illustrates steps that may be taken in determining the bottlenecks and shadowbottlenecks. The basic step S7 may include the detailed steps S7.1, S7.2, S7.3, S7.4, S7.5, S7.6, S7.7, S7.8, S7.9, S7.10, S7.11 and S7.12. In detailed step S7.1, custom application 14 may select the process records of table 39 which have a value in the field "InputAbundance" which is greater than zero or which have a value of 0 in the field "InputtingProcesses". Then custom application 14 may sort these selected records in rising order by the value of the fields "ProductNumber" and "Output" (see FIG. 15A and FIG. 15B). In detailed step S7.3, custom application 14 may initiate the value of parameter p. Custom application 14 may store for each product p the value of parameter ShadowBottleneckDetermined(p,t) in to the memory of computer 13. The parameter ShadowBottleneckDetermined(p,t) may indicate for each product, whether a shadowbottleneck in the production and selling of product p during period t has been determined and stored in table 36 or not. If for instance the value of ShadowBottleneckDetermined(product1,t) is true, then the shadowbottleneck in the production and selling of product1 during period t has been determined and stored in table 39. And if for instance the value of ShadowBottleneckDetermined(product2,t) is false then a shadowbottleneck in the production and selling of product2 during period t has not been determined and stored in table 39. The value of parameter ShadowBottlenenckDetermined(p,t) may be set to false for each product in detailed step S7.4, indicating that there is no product for which the shadowbottleneck has been determined yet during the current execution of step S7. Then custom application 14 may start reading all the selected and sorted process records, starting with the first record in detailed step S7.5. In detailed step S7.6 custom application 14 may check whether the ProductNumber of the concerned process record is different from the value of parameter p. If custom application 14 determines that the ProductNumber of the concerned process record is different from the current value of parameter p, then custom application 14 may read a process record of a process which was involved in the production and selling of a product for which no other process record has been read yet during the current execution of step S7. Custom application 14 may set the value of parameter p to ProductNumber in detailed step S7.7. If custom application 14 determines that the value of the field "ProductNumber" of the current process record is not different from the current value of parameter p, then custom application 14 may read a process record of a process which was involved in the production and selling of a product for which already another process record has been read by custom application 14 during the current execution of step S7. If custom application 14 may determine that the value of the field "ProductNumber" of the current process record is not different from the current value of parameter p, then custom application 14 may perform detailed step S7.9. In detailed step S7.8 custom application 14 may determine the name of the process which was the bottleneck in the production and selling of product p during period t by reading the field "ProcessName" of the current process record. In this manner, the current process record is the process record of the bottleneck in the production and selling of product p, because the current process record is the first read process record which relates to the production and selling of product p and the process records are sorted by the field "Output" in rising order and the value in the field "InputAbundance" in the current record of this process is greater than zero or the value of the field "InputtingProcesses" is zero. In detailed step S7.8, custom application 14 may also determine the total sales of product p during period t as the output of the bottleneck in the production and selling of product p during period t. Custom application 14 may determine total sales of product p during period t by reading the field "Output" of the current process record of the bottleneck. In detailed step S7.9 custom application 14 may check whether a search for a shadowbottleneck in the production and selling of product p should be made, or that a shadowbottleneck in the production and selling of product p already has been determined during the current execution of step S7. If the parameter ShadowBottleneckDetermined(p,t) is true, then custom application 14 may perform detailed step S7.11. If the parameter ShadowBottleneckDetermined(p,t) is false, then a shadowbottleneck in the production and selling of product p has not yet been determined during the current execution of step S7 and custom application 14 may perform detailed step S7.10. In detailed step S7.10 custom application 14 may determine the name of the shadowbottleneck in the production and selling of product p during period t as ShadowBottleneck(p,t) by reading the field "ProcessName" of the current process record. According to this embodiment of the invention, the current process record is the process record of the shadowbottleneck in the production and selling of product p during period t because the current process record is the second read process record which relates to the production and selling of product p, and the process records are sorted by the field "Output" in rising order, and the current process record relates to a process with a value "InputAbundance" that is greater than zero or a value in the field "InputtingProcesses" which is equal to zero. In detailed step S7.10, custom application 14 may also determine the output of the shadowbottleneck in the production and selling of product p during period t by reading the field "Output" of the current process record of this shadowbottleneck in the production and selling of product p during period t. In detailed step S7.10 custom application 14 may also set the value of parameter ShadowBottleneckDetermined(p,t) to true, indicating that custom application 14 has determined a shadowbottleneck in the production and selling of product p. In detailed step S7.11 custom application 14 may check whether all selected process records have been read by custom application 14 during the current execution of step S7. If there are still selected process records which have not been read yet by custom application 14 during the current execution of step S7, then custom application 14 may read the next selected record in detailed step S7.12. If all selected process records have been read by custom application 14 during the current execution of step S7, then the bottlenecks and the shadowbottlenecks are determined.

S8 Determining the Magnitude of Bottlenecks

As stated above, the sales of a product are equal to the output of the bottleneck in the production and selling of that product. If the output of a bottleneck in the production and selling of product p was equal to or higher than the sales target for product p then the targeted sales of product p were completely fetched. If, however, the output of a bottleneck in the production and selling of product p was lower than the sales target of product p, then a part of the targeted sales were not fetched. The part of the targeted sales of a product that were fetched while the concerned bottleneck occurred may be expressed by the parameter "FetchedWithBottleneck".

According to an embodiment of the present invention, the magnitude of a bottleneck is an estimation of the part of the targeted sales of a product which were not fetched because of the occurrence of the concerned bottleneck, but which would had been fetched if the concerned bottleneck had not occurred. The part of the targeted sales which would had been fetched if the concerned bottleneck had not occurred, may be expressed by the parameter "FetchedWithoutBottleneck". The part of the targeted sales of a product which was missed because of the occurrence of the concerned bottleneck, but which would had been fetched if the concerned bottleneck had not occurred, may be expressed by the difference between the parameters FetchedWithBottleneck and FetchedWithoutBottleneck. The magnitude of a bottleneck in the production and selling of product p during period t may thus be calculated according to:

$$\text{BottleneckMagnitude}(p,t) = \text{FetchedWithBottleneck}(p,t) - \text{FetchedWithoutBottleneck}(p,t) \quad \text{(Equ. 5)}.$$

The part of the targeted sales of product p that was fetched during period t (while the bottleneck in the production and selling of product p occurred) can never be higher than the targeted sales of product p and is equal to the output of the bottleneck in the production and selling of product p during period t if the output of this bottleneck is lower than the sales target of product p. The parameter FetchedWithBottleneck may be calculated according to Equ. 6.

$$\text{FetchedWithBottleneck}(p,t) = \min(\text{OutputBottleneck}(p,t), \text{SalesTarget}(p,t)) \quad \text{(Equ. 6)}$$

The variable "FetchedWithoutBottleneck" is an estimation of the part of the targeted sales of product p during period t that would had been fetched if the bottleneck in the production and selling of product p had not occurred during period t. If the bottleneck in the production and selling of product p had not occurred during period t, then the part of the targeted sales that would had been fetched could not be more than the targeted sales. If no shadowbottlenck occurred in the production and selling of product p during period t, the variable "FetchedWithoutBottleneck" may be calculated according to Equ. 7

$$\text{FetchedWithoutBottleneck}(p,t) = \text{SalesTarget}(p,t) \quad \text{(Equ. 7)}$$

If however a shadowbottleneck occurred during period t which had an output that was lower than the targeted sales, then the part of the targeted sales that would have been fetched if the bottleneck in the production and selling of product p had not occurred during period t, would have been limited by the output of this shadowbottleneck. If a shadowbottleneck occurred in the production and selling of product p during period t the variable "FetchedWithoutBottleneck" may be calculated according Equ. 8

$$\text{FetchedWithoutBottleneck}(p,t) = \min(\text{OutputShadowBottleneck}(p,t), \text{SalesTarget}(p,t)) \quad \text{(Equ. 8)}$$

Figure 17:
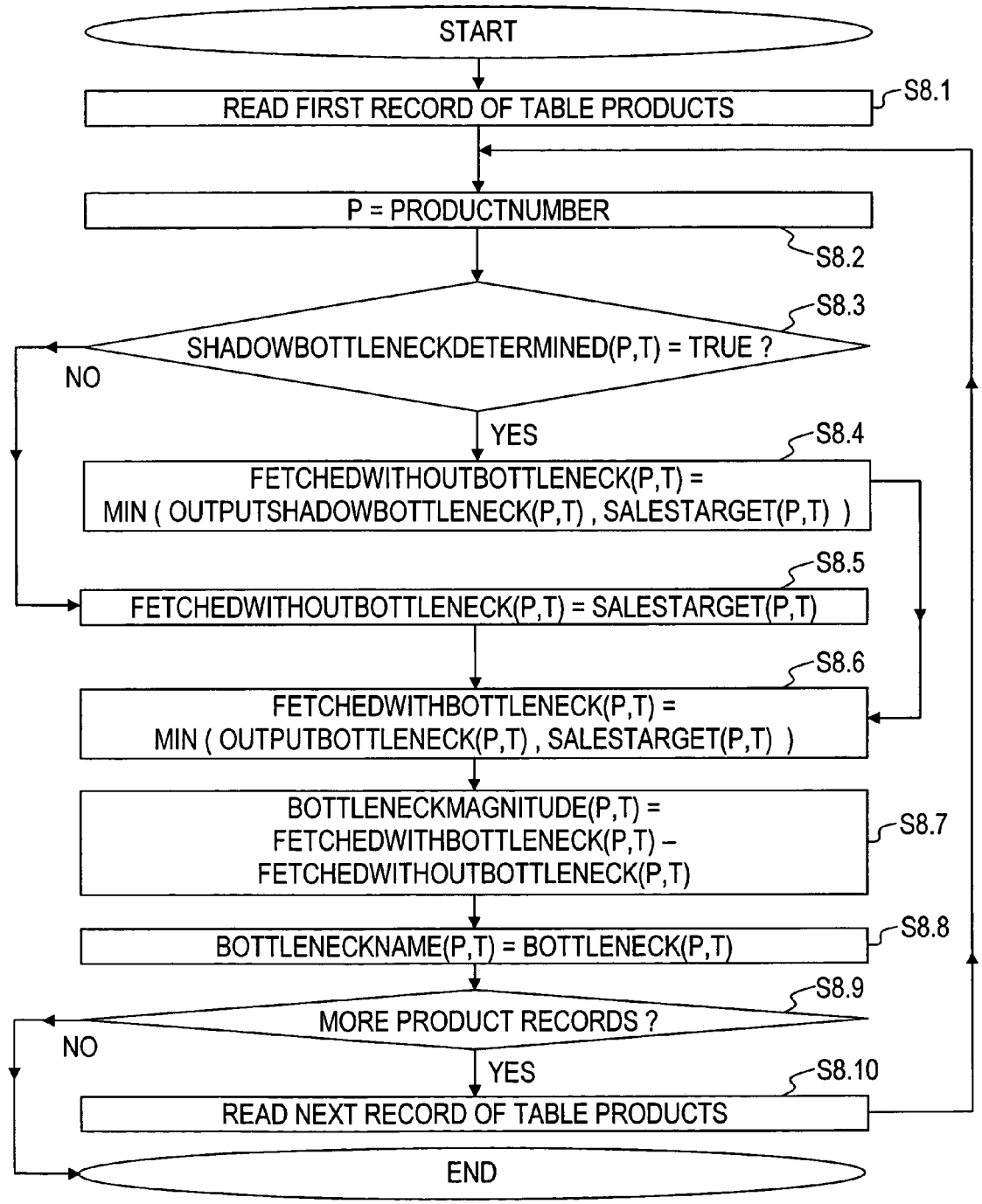
FIG. 17 is a flow chart showing the determination of the magnitude of the bottlenecks according to an embodiment of the present invention.

FIG. 17 shows steps that may be taken to determine the magnitude of bottlenecks. The basic step S8 may include the detailed steps S8.1, S8.2, S8.3, S8.4, S8.5, S8.6, S8.7, S8.8, S8.9 and 8.10. Custom application 14 may read every product record in table 36, starting with the first record in step S8.1. In step S8.2 custom application 14 may determine parameter p by reading the field "ProductNumber" of the current product record. Then custom application 14 may check whether the parameter ShadowBottleneckDetermined(p,t) is true in step S8.3. If ShadowBottleneckDetermined(p,t) is true then a shadowbottleneck is detected in the production and selling of product p during period t and custom application 14 may perform detailed step S8.4. If ShadowBottleneckDetermined (p,t) is false then no shadowbottleneck is detected in the production and selling of product p during period t and custom application 14 may perform detailed step S8.5. In detailed step S8.4 the parameter FetchedWithoutBottleneck (p,t) may be calculated according to Equ. 8. In detailed step S8.5 the parameter FetchedWithoutBottleneck(p,t) may be calculated according to Equ. 7. The value of SalesTarget(p,t) may be determined by reading the field "SalesTarget(p,t)" of the current product record. Then custom application 14 may calculate in detailed step S8.6, the value of the FetchedWithBottleneck(p,t) parameter according to Equ. 6. The value of OutputBottleneck(p,t) may be determined by reading the field "Sales(p,t)" of the current product record. Custom application 14 may calculate the magnitude of the bottleneck in the production of product p in detailed step S8.7 according to Equ. 5. The value of the bottleneck magnitude may then be stored in the field "BottleneckMagnitude" of the current product record. If custom application 14 has calculated that the magnitude of the bottleneck in the production and selling of product p is equal to zero, then this value may not be used in the displaying of reports. The name of the bottleneck in the production of product p may be stored in the field "BottleneckName" of the current product record in detailed step S8.8. In detailed step S8.9, custom application may check whether there are product records in table 36 which have not been read yet by custom application 14 during the current execution of step S8. If there are still product records which has not been read yet by custom application 14 during the current execution of step S8, then custom application 14 may read the next record of table 36 in detailed step S8.10. If there are no product records which have not been read by custom application 14 during the current execution of step S8, then the fields "BottleneckName" and "BottleneckMagnitude" of every product record in table 36 is filled with the names of the bottlenecks and the part of the targeted sales that were not fetched because of the occurrence of bottlenecks.

S9 Grouping Bottlenecks

As stated above, according to an embodiment of this invention the magnitude of a bottleneck expresses the part of the targeted sales of a product that is not fetched because of the occurrence of that bottleneck in the production and selling of that product during a time period. If the targeted sales, production, spoilage and beginstocks of the concerned product in a next period will be comparable to the targeted sales, production, spoilage and beginstocks of the concerned product during period t, then the magnitude of the bottleneck in the production and selling of the concerned product during period t, gives a good indication of the targeted sales that will not be fetched in a next period because of the occurrence of the concerned bottleneck. The magnitude of a bottleneck then gives an estimation of the total amount of targeted sales of the concerned product that can be regained when the bottleneck should be solved in a next time period by an investment.

The names of processes may identify the part of the business where the process takes place. If a process was a bottleneck during a period and the name of the process refers to the part of the business where the process took place, the management of a business knows in what part of the business this bottleneck occurred. The management then also knows in what part of the business they should invest to solve the concerned bottleneck. The investment in the concerned part of the business could consist of an investment which increases the production capacity of the concerned part of the business.

In one particular part of the business, two or more products might be processed by two or more processes. In the casting department of factory Z illustrated in FIG. 3 for instance, the dress hanger is processed by casting process 21 and the shoehorn is processed by casting process 28. If two or more products are processed by two or more processes in one part of the business, then two or more bottlenecks might occur in that particular part of the business. All the bottlenecks which occurred in a particular part of the business may be grouped together. The magnitude of all the bottlenecks which occurred in the concerned part of the business may be summed. In this way the management of a business knows the total amount of targeted sales that were not fetched because of the occurrence of bottlenecks in the concerned part of the business during period t. This total amount of bottlenecks in a particular part of the business gives an estimation of the total amount of targeted sales that can be regained when the bottlenecks should be solved in a next time period by an investment in the concerned part of the business. This total amount of targeted sales that were not fetched because bottlenecks occurred in part b of the business during period t, (BottleneckMagnitudeTotal(b,t)) thus could relate to one or more products and is an estimation of the revenues per period of an investment which solves the bottlenecks in part b. BottleneckMagnitudeTotal(b,t) may be expressed in units of products, in selling prices or in gross margin. The bottlenecks which occurred in a particular part of the business could be grouped together easily, if they all have the same name which refers to the same particular part of the business.

Figure 18:
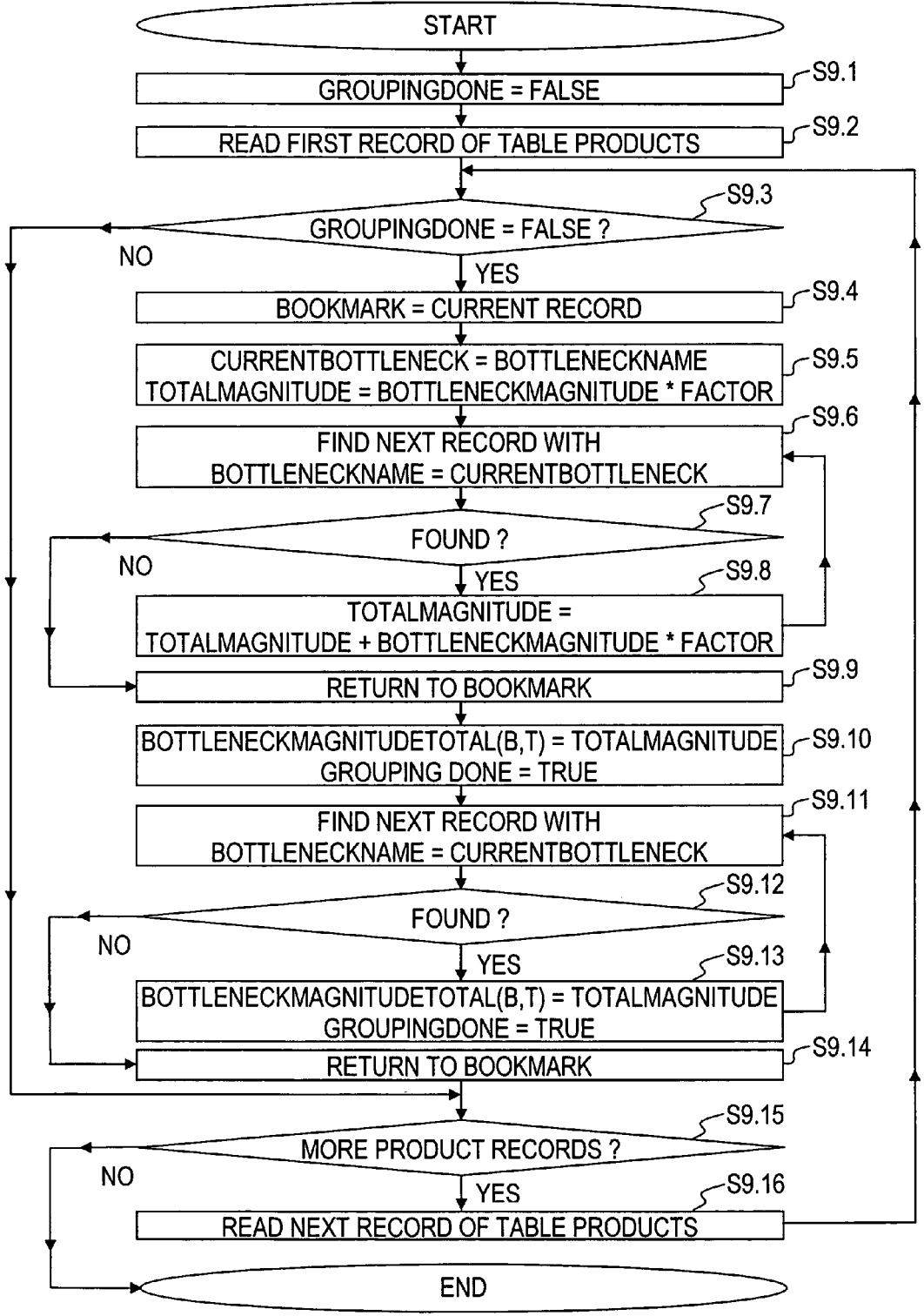
FIG. 18 is a flow chart showing the determination of the total magnitude of each bottleneck according to an embodiment of the present invention.

FIG. 18 illustrates steps that may be taken in grouping bottlenecks. The basic step S9 may include the detailed steps S9.1, S9.2, S9.3, S9.4, S9.5, S9.6, S9.7, S9.8, S9.9, S9.10, S9.11, S9.12, S9.13, S9.14, S9.15 and S9.16. In detailed step S9.1, custom application 14 may set the value of the field "GroupingDone" of each product record in table 36 to false, indicating that each product's bottleneck has not been grouped yet. Then custom application 14 may start reading all the product records, starting with the first product record in detailed step S9.2. In detailed step S9.3 custom application 14 may check whether the value of the field "GroupingDone" of the current product record is false. If custom application 14 determines that the value of the field "GroupingDone" of the current product record is not false, then custom application 14 may perform detailed step S9.15. If custom application 14 determines that the value of the field "GroupingDone" of the current product record is false, then custom application 14 may set the value of the parameter Bookmark to the number of the current product record in detailed step S9.4. In detailed step S9.5 custom application 14 may determine the name of the current bottleneck which is the bottleneck in the production and selling of the product of the current product record by reading the field "BottleneckName" of the current product record. Then the magnitude of the current bottleneck may be expressed in units of products, selling prices or in gross margin by multiplying the value of the field "BottleneckMagnitude" by the parameter Factor. The value of the parameter Factor may be equal to 1, if the value of parameter ExpressMode is 1. The value of parameter the Factor may be equal to the selling price of the concerned product, if the value of parameter ExpressMode is 2. The value of parameter Factor may be equal to the gross margin of the concerned product, if the value of parameter ExpressMode is 3. In an embodiment of the invention, the name of each process and bottleneck refers to a particular part of the business. In this embodiment, the name of the current bottleneck refers to part b of the business during period t. In this embodiment, current application 14 may calculate the magnitude of the bottlenecks which occurred in part b of the business in detailed steps S9.6, S9.7 and S9.8. The magnitude of all the bottlenecks which occurred in part b of the business during period t may be expressed by the parameter TotalMagnitude, and may be calculated by enumerating the magnitude of the bottlenecks which occurred in part b of the business during period t. The names of the processes and thus bottlenecks reflect the part of the business where the concerned processes and bottlenecks took place. In order to enumerate the magnitude of the bottlenecks which occurred in part b of the business during period t, custom application 14 may search for other product records which also have the name of the current bottleneck in the field "BottleneckName" in detailed step S9.6. If custom application 14 does not find another product record which also holds the name of the current bottleneck in the field "BottleneckName", then custom application 14 may set the pointer in the product table to the product record which number is stored in the parameter Bookmark in detailed step S9.9. If custom application 14 finds another record which holds the name of the current bottleneck in the field "BottleneckName", then custom application 14 may raise the value of TotalMagnitude by the magnitude of the bottleneck of this product in detailed step S9.8. In detailed step S9.10 custom application 14 may store the value of the parameter TotalMagnitude in the field "BottleneckMagnitudeTotal(b,t)" of the product record which number is stored in the parameter Bookmark, and may set the value of the field "GroupingDone" to True, indicating that for this product record the BottleneckMagnitudeTotal(b, t) is calculated and stored. In detailed steps S9.11, S9.12 and S9.13 custom application 14 may store the value of TotalMagnitude in the field "BottleneckMagnitudeTotal(b,t)" of all the product records of products which had a bottleneck which occurred in part b of the business. In detailed step S9.11 custom application 14 may start searching for another product record which holds the name of the current bottleneck in the field "BottleneckName". In detailed step S9.12 custom application 14 may check whether another product record is found which holds the name of the current bottleneck in the field "BottleneckName". If custom application 14 does not find another product record which holds the name of the current bottleneck in the field "BottleneckName", then custom application 14 may return to the product record which number is stored in the parameter Bookmark. If custom application 14 does find another record which holds the name of the current bottleneck in the field "BottleneckName", then in detailed step S9.13 custom application 14 may store the value of TotalMagnitude in the field "BottleneckMagnitudeTotal" of the found product record, and may set the value of the field "GroupingDone" to True, indicating that for this product record the BottleneckMagnitudeTotal(b,t) is calculated and stored. In detailed step S9.14 custom application 14 may set the pointer in the products table to the product record which number is stored in the parameter Bookmark. In detailed step S9.15 custom application 14 may check whether all product records have been read by custom application 14 during the current execution of step S9. If there are still product records which have not been read yet by custom application 14 during the current execution of step S9, then custom application 14 may read the next product record in detailed step S9.16. If all product records have been read by custom application 14 during the current execution of step S9 then all the bottlenecks are grouped.

S10 Displaying an Investment Allocation Report

Figure 19:
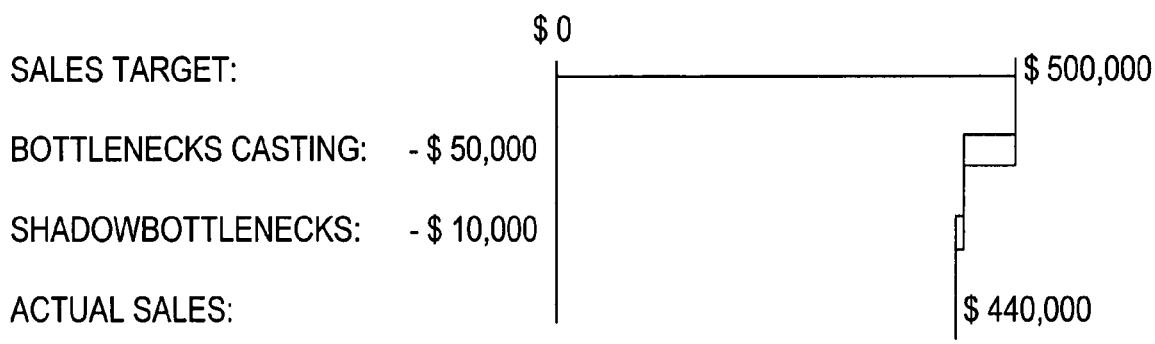
FIG. 19 is an investment allocation report according to an embodiment of the present invention.

FIG. 19 illustrates a report format according to an embodiment of the invention, applied to the factory Z illustrated in FIG. 3. The maximum production capacity of sales and purchasing are impossible to determine for factory Z. The maximum production capacity of the casting department is not known by the management of factory Z. The sales process and purchase process often processes dress hangers and shoehorns at the same time. Therefore it may be hard to determine how much time these processes spend on each particular type of product. Furthermore the management of factory Z does not know what the maximum speed of each casting process is. Yet, factory Z has determined its bottlenecks successfully by inputting and storing the data of products and all the processes in database 15 according to an embodiment of the invention. Thus the only data on processes which were used in order to determine bottlenecks in factory Z were the name, the number of inputting processes, the production, the spoilage and the beginstocks of processes. All processes could be included, including casting, sales and purchase processes, because according to this invention there is no need to store data on maximum production capacities, the time which processes spend on each particular product, or maximum speed of processes. The bottlenecks are determined according to the invention and are displayed in an investment allocation report, an example of which is shown in FIG. 19. This report shows that bottleneck(s) occurred in the casting department and that the total magnitude of the bottleneck(s) in the casting bottleneck was $50,000 during period t. The estimated part of the targeted sales that were not fetched because one or more bottlenecks in production limited sales, represents a value of $50,000, expressed in selling prices. The investment allocation report estimates that one or more bottlenecks in the casting department and one or more shadowbottlenecks limited the actual total sales to $440,000 during period t. The investment allocation report illustrated in FIG. 19 advises the management of factory Z to invest in the casting department. Factory Z could for instance invest in new machines, tools or more staff. Furthermore, the investment allocation report illustrated in FIG. 19 advises the management of factory Z not to invest in other parts of factory Z because in these other parts of factory Z no bottlenecks occurred during period t. Furthermore the investment allocation report illustrated in FIG. 19 also advises the management on the costs and revenues of investments. The total magnitude of the bottlenecks which occurred in a part of a business is an estimation of the part of the targeted sales that were not fetched during a period because bottlenecks occurred in that part of the business. The total magnitude of the bottlenecks which occurred in a part of a business thus represents an estimation of the revenues per period of solving the bottlenecks in the concerned part of the business. In this way the investment allocation report helps to weigh the revenues per period of an investment against the costs per period of an investment. The investment allocation report in FIG. 19 for instance advises factory Z not to invest more than $50,000 in the casting department per period. Thus the investment allocation report illustrated in FIG. 19 not only advises management of business in which parts of the business to invest and in which parts of the business not to invest, it also advises on the maximum costs per period of an investment in a part of the business.

In another embodiment of this invention other data on products and processes could be stored in the computer. For instance instead of storing the next process number, the unique number(s) of each inputting processes could be stored in the memory of the computer. Or no data on the target selling price or variable costs of products may be inputted in the computer and stored in a database and the bottlenecks may be expressed in average selling prices or units of products. In another embodiment of this invention no data on the average selling price or variable costs of products are inputted in the computer and stored in a database and the bottlenecks are expressed in target selling prices or units of products. Or no data on the target selling price, average selling price or variable costs of products may be inputted in the computer and stored in a database, and the bottlenecks are expressed in units of products. Or no data on the variable costs of products are inputted in the computer and stored in a database, and the bottlenecks are expressed in selling prices or units of products. Or no data on products are inputted in the computer and the bottleneck in the production and selling of a product is calculated according to Equ. 9 and is expressed in units of products.

In an alternate embodiment, defining the processes and their relationships could be done by first defining all the processes and then defining the interrelationships between the processes, by defining which process, processes the production of which other process. This may also be done in such a manner that for each product only processes are defined which has to contribute to each unit of that product and for each product only one process is defined as the process, which has a production that is not used as input for any other process and if the production of a process is used as input for another process, then its production is used as input for only one other next process.

In another embodiment of this invention defining the processes and their interrelationships could be done by first defining one or more processes and then defining one process for each already defined process as the next process. In this embodiment the user repeats the defining of one process for each already defined process as the next process until all the processes and their interrelationships are defined. This may also be done in such a manner that for each product only processes are defined which must contribute to each unit of that product and for each product only one process is defined as the process, which has a production that is not used as input for any other process and if the production of a process is used as input for another process, then its production is used as input for only one other next process.

Other possible variations include making the sales target equal to the pursued sales, or making the sales target equal to the pursued production. Further, in another embodiment of the invention, the magnitude of bottlenecks per product may be determined.

While my above description contains many specifications, these should not be construed as limitations on the scope of the invention, but rather as an example. Many other variations are possible. For example, the magnitude of a bottleneck in the production and selling of product p during period t can be calculated according to:

$$\text{BottleneckMagnitude}(p,t) = \text{OutputBottleneck}(p,t) - \text{OutputShadowBottleneck}(p,t) \quad \text{(Equ. 9)}.$$

It will be appreciated that the invention may be implemented using one or more keyboards, pointing devices, printers, monitors or computers. Further, other storage formats or devices may be used. It will also be appreciated that the invention may be implemented using hypothetical data, actual data, or a combination of both.

Although the present invention has been described with respect to one or more particular embodiments, it will be understood that other embodiments of the invention may be made without departing from the spirit and scope of the invention. Hence, the invention is deemed limited only by the appended claims and the reasonable interpretation thereof.

What is claimed is:

1. A bottleneck determination system, comprising a computer programmed to:

receive and store on a computer readable medium information regarding sequential processes, each of the sequential processes having an action that results in producing a product and that must occur in order to produce a finished product;

determine and store on a computer readable medium a beginstock amount for each of the sequential processes, the beginstock amount for at least one of the sequential processes being approximately equal to a number of pieces of the product available at the beginning of a time period for use in executing an immediate next one of the sequential processes;

determine and store on a computer readable medium a production amount for each of the sequential processes, the production amount for at least one of the sequential processes being approximately equal to a number of products produced during the time period;

determine and store on a computer readable medium a spoilage amount for each of the sequential processes, the spoilage amount for at least one of the sequential processes being approximately equal to a number of pieces of the product that were deemed unsuitable during the time period;

determine a netproduction value for each of the sequential processes, the netproduction value for at least one of the sequential processes being the production amount minus the spoilage amount;

determine a netoutput value for each of the sequential processes, the netoutput value for at least one of the sequential processes being the production amount plus the beginstock amount minus the spoilage amount;

identify subsequent sequential processes from among the sequential processes, the subsequent sequential processes being those sequential processes that have at least one preceeding process, and determine an input value for each subsequent sequential process, the input value for at least one of the subsequent sequential processes being a lowest netoutput value for sequential processes that precede the at least one of the subsequent sequential processes;

determine an inputabundance value for each of the sequential processes, the inputabundance value for at least one of the sequential processes being the input value minus the netproduction value;

select processes having an inputabundance value greater than zero to provide a selected group of processes;

determine output values for the processes in the selected group, the output value for at least one of the processes in the selected group being the netoutput value plus the beginstock amounts of subsequent processes;

select a bottleneck process from the selected group, the bottleneck process having an output value that is lowest of all the output values.

2. The system of claim 1, wherein the computer is further programmed to select a shadowbottleneck process from among the selected group of processes, the shadowbottleneck process having an output value that is second lowest of all the output values.

3. The system of claim 2, wherein the computer is further programmed to determine a bottleneck magnitude, by:

determining a fetchedwithbottleneck magnitude, the fetchedwithbottleneck magnitude being a lesser one of the output value of the bottleneck process and a sales target;

determining a fetchedwithoutbottleneck magnitude, the fetchedwithoutbottleneck magnitude being a lesser one of a sales target and the output value of the shadowbottleneck;

subtracting the fetchedwithbottleneck magnitude from the fetchedwithoutbottleneck magnitude, to provide the bottleneck magnitude.

4. The system of claim 2, wherein the computer is further programmed to determine a bottleneck magnitude, by subtracting the output value of the shadowbottleneck from the output value of the bottleneck.

5. The system of claim 3, wherein the computer is further programmed to multiply the bottleneck magnitude by a gross margin of the finished product.

6. The system of claim 3, wherein the computer is further programmed to multiply the bottleneck magnitude by a selling price of the finished product.

7. The system of claim 4, wherein the computer is further programmed to multiply the bottleneck magnitude by a gross margin of the finished product.

8. The system of claim 4, wherein the computer is further programmed to multiply the bottleneck magnitude by a selling price of the finished product.

9. The system of claim 1, wherein the computer is further programmed to determine a bottleneck magnitude, by:

determining a fetchedwithbottleneck magnitude, the fetchedwithbottleneck magnitude being a lesser one of the output value of the bottleneck process and a sales target;

determining a fetchedwithoutbottleneck magnitude, the fetchedwithoutbottleneck magnitude being a sales target;

subtracting the fetchedwithbottleneck magnitude from the fetchedwithoutbottleneck magnitude, to provide the bottleneck magnitude.

10. The system of claim 9, wherein the computer is further programmed to multiply the bottleneck magnitude by a gross margin of the finished product.

11. The system of claim 9, wherein the computer is further programmed to multiply the bottleneck magnitude by a selling price of the finished product.

12. The system of claim 1, wherein the information regarding sequential processes is formulated so that at least one of the sequential processes is defined such that its product is used as input by only one other sequential process.

13. The system of claim 1, wherein the information regarding sequential processes identifies only one sequential process as a last process.

14. The system of claim 1, wherein the computer is further programmed to select processes to provide the selected group by including processes which do not have a preceding process.

* * * * *